US012670311B2

(12) United States Patent
Gauthier et al.

(10) Patent No.: US 12,670,311 B2
(45) Date of Patent: Jun. 30, 2026

(54) AUTOMATIC LAYOUT UPDATES FOR DOCUMENT SPACES IN A GROUP-BASED COMMUNICATION SYSTEM

(71) Applicant: Salesforce, Inc., San Francisco, CA (US)

(72) Inventors: Greg Joseph Gauthier, Mountain View, CA (US); Aubrey Elizabeth Logan-Terry, Oakland, CA (US); James Barnes, San Francisco, CA (US); Michael Hahn, Los Angeles, CA (US)

(73) Assignee: Salesforce, Inc., San Francisco, CA (US)

( * ) Notice: Subject to any disclaimer, the term of this patent is extended or adjusted under 35 U.S.C. 154(b) by 387 days.

(21) Appl. No.: 18/057,631

(22) Filed: Nov. 21, 2022

(65) Prior Publication Data

US 2024/0169140 A1 May 23, 2024

(51) Int. Cl.
| | |
|---|---|
| *G06F 40/106* | (2020.01) |
| *G06F 40/166* | (2020.01) |
| *H04L 51/046* | (2022.01) |

(52) U.S. Cl.
CPC .......... *G06F 40/106* (2020.01); *G06F 40/166* (2020.01); *H04L 51/046* (2013.01)

(58) Field of Classification Search
CPC ...... G06F 40/106; G06F 40/166; G06F 40/18; G06F 16/252; G06F 16/951; G06F 16/93;
(Continued)

(56) References Cited

U.S. PATENT DOCUMENTS

| | | | |
|---|---|---|---|
| 2010/0042684 A1* | 2/2010 | Broms | G06F 3/0483 |
| | | | 715/764 |
| 2011/0219076 A1* | 9/2011 | Roope | G06F 15/16 |
| | | | 709/205 |

(Continued)

OTHER PUBLICATIONS

"Die, Email, Die! A Flickr Cofounder Aims to Cut US All Some Slack", Readwriteweb, Lexisnexis, https://advance.lexis.com/api/permalink/33dd79e2-9015-409d-ae27-5a2c7e86bf31/?context=1000516>. (dated Aug. 14, 2013, 4:15 PM) 2 pages.

(Continued)

*Primary Examiner* — Matthew Ell
(74) *Attorney, Agent, or Firm* — Holland & Hart, LLP.

(57) ABSTRACT

Methods, systems, apparatuses, devices, and computer program products are described. A group-based communication system may support automatic layout updates for a document space. If a user adds an object into the document space, the system may generate a card representing the object. The card may include a link to a resource external to the document space and a preview image for the object, where the preview image may be rendered based on unfurling the link. The system may update a layout of the document space to include the generated card and may send, for display in a user interface (UI) of a user device, the updated layout. In some examples, a user may select to reposition the card within the UI (e.g., by dragging-and-dropping the card within the document space). The system may further update the layout of the document space based on the repositioning of the card.

18 Claims, 12 Drawing Sheets

(58) Field of Classification Search

CPC .... G06F 40/177; G06F 16/23; G06F 16/3322;
G06F 3/0483; H04L 51/46; G07F 3/0482

USPC ........................................................ 715/751

See application file for complete search history.

(56) References Cited

U.S. PATENT DOCUMENTS

| | | | | |
|---|---|---|---|---|
| 2014/0258849 A1* | 9/2014 | Chung | .................. | G06F 40/106 |
| | | | | 715/243 |
| 2014/0298221 A1* | 10/2014 | Pickersgill | ........ | G06F 16/4387 |
| | | | | 715/765 |
| 2014/0337730 A1* | 11/2014 | King | .................... | G06F 3/0481 |
| | | | | 715/781 |
| 2016/0203510 A1* | 7/2016 | Pregueiro | .............. | G06Q 10/06 |
| | | | | 705/14.45 |
| 2017/0078232 A1* | 3/2017 | Faruk | .................... | H04L 67/306 |
| 2017/0139890 A1* | 5/2017 | Bendig | .................. | G06F 40/18 |
| 2018/0287982 A1 | 10/2018 | Draeger et al. | | |
| 2020/0367026 A1* | 11/2020 | Wu | .......................... | G06T 13/80 |
| 2023/0376557 A1* | 11/2023 | Mancuso | ........... | G06F 3/04842 |
| 2024/0103888 A1* | 3/2024 | Ding | .................. | G06Q 10/1093 |
| 2024/0143346 A1* | 5/2024 | N'Guessan | ............. | G06F 9/451 |

OTHER PUBLICATIONS

"How Slack changed the way we work by putting the customer experience first", Repeat Customer Podcast, Episode 3, [online][retrieved May 9, 2019]. Retrieved from the Internet: <URL: https://www.zendesk.com/resources/slack-customer-experience/, (2019) 13 pages.

Adrienne LaFrance, "The Triumph of Email", Atlantic Online, Lexisnexis, https://advance.lexis.com/api/permalink/32d7ddd9-d4c1-4a73-86f7-08ab5842fde6/?context=1000516, (dated Jan. 6, 2016) 5 pages.

David Auerbach, "Re-Animator. How Stewart Butterfield created Flickr and Slack out of the ashes of failed projects" [online] [retrieved May 9, 2019]. Retrieved from the Internet: <URL: https://slate.com/business/2014/05/stewart-butterfield-flickr-and-slack-how-he-snatched-victory-from-the-jaws-of-defeat.html> (dated May 28, 2014, 2:48 PM) 8 pages.

Emie Smith, "Picking Up The Slack", TEDIUM, [online][retrieved May 9, 2019]. Retrieved from the Internet: <URL: https://tedium.co/2017/10/17/irc-vs-slack-chat-history/>. (dated Oct. 17, 2017) 8 pages.

Internet Relay Chat, Wikipedia, [online][retrieved May 30, 2019]. Retrieved from the Internet: <URL: https://en.wikipedia.org/wiki/Internet_Relay_Chat>. (dated May 28, 2019) 17 pages.

Jonathan Vanian, "Why these startups think chat apps are the next big thing in workplace collaboration", Gigaom, Lexisnexis, https://advance.lexis.com/api/permalink/e83778c8-09c8-43aa-9ba0-88526283de69/?context=1000516, (dated Aug. 1, 2014, 5:45 PM) 4 pages.

Matsumoto, T. et al., "Chocoa Communicator—A New Communication System Based on Awareness and Text Communications-", Fujitsu Sci. Tech. J., 36, 2, (Dec. 2000) 154-161.

Matthew Ingram, "Flickr co-founder launches Slack, an all-in-one messaging tool designed to kill email forever", Gigaom, Lexisnexis, https://advance.lexis.com/api/permalink/0b676b7c-aec3-4560-861e-d030d1dd008c/?context=1000516, (dated Feb. 12, 2014, 7:03 PM), 2 pages.

Michael Carney, "Slack is thriving on a cocktail of whimsy and great timing", Pandodaily, Lexisnexis, https://advance.lexis.com/api/permalink/dd2d4ee5-2ddf-4d3a-a1d9-3bcee5e38b74/?context=1000516, (dated Feb. 6, 2015, 2:12 AM) 3 pages.

Mike Issac, "Slack, a Start-Up With an App to Foster Business Collaboration, Is Valued at $1.1 Billion", The New York Times Blogs (Bits), Lexisnexis, https://advance.lexis.com/api/permalink/3eb84b34-a819-4d7d-9573-89d9598a4963/?context=1000516> (dated Oct. 31, 2014) 2 pages.

Olkarinen, J. & Reed, D., "Internet Relay Chat Protocol", Request for Comments: 1459, Network Working Group, [online][retrieved May 30, 2019]. Retrieved from the Internet: <URL: https://www.rfc-editor.org/rfc/rfc1459.txt>. (dated May 1993) 66 pages.

Rebecca Walberg, "Email biggest office waste of time: survey", National Post, at FP10, Lexisnexis, https://advance.lexis.com/api/permalink/96268e3f-26ad-48ac-a98f-6c39804ebded/?context=1000516, (dated Mar. 4, 2014) 2 pages.

Robert Hof, "Stewart Butterfield on How Slack Became a $2.8 Billion Unicorn", Forbes, [online][retrieved May 9, 2019]. Retrieved from the Internet: <URL: https://www.forbes.com/sites/roberthof/2015/06/02/stewart-butterfield-on-how-slack-became-a-2-8-billion-unicorn-2/#7c31937d7d9c>. (dated Jun. 2, 2015, 3;25 PM), 3 pages.

The Big Pivot w/ Slack's Stewart Butterfield, Masters of Scale Podcast, Episode 13 (Aired Nov. 14, 2017), https://mastersofscale.com/#/stewart-butterfield-the-big-pivot/, (dated Jan. 17, 2018) 27 pages.

* cited by examiner 110-a 130-a 110-b 130-b 105-a 105-b 105-c

Data Center

120

140

Cloud
Platform

135

115

125

130-c 110-c 130-d 110-d

100

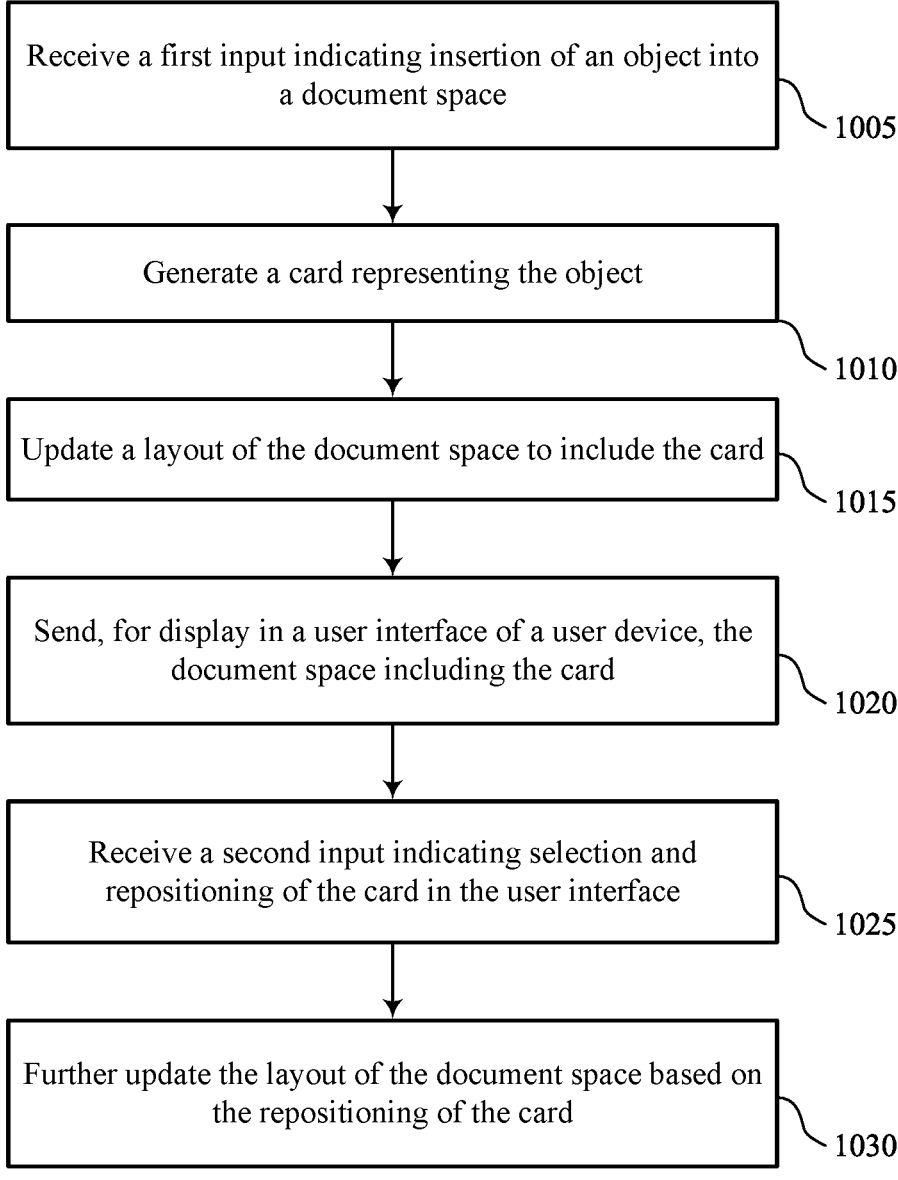

Receive a first input indicating insertion of an object into a document space
1005

Generate a card representing the object
1010

Update a layout of the document space to include the card
1015

Send, for display in a user interface of a user device, the document space including the card
1020

Receive a second input indicating selection and repositioning of the card in the user interface
1025

Further update the layout of the document space based on the repositioning of the card
1030

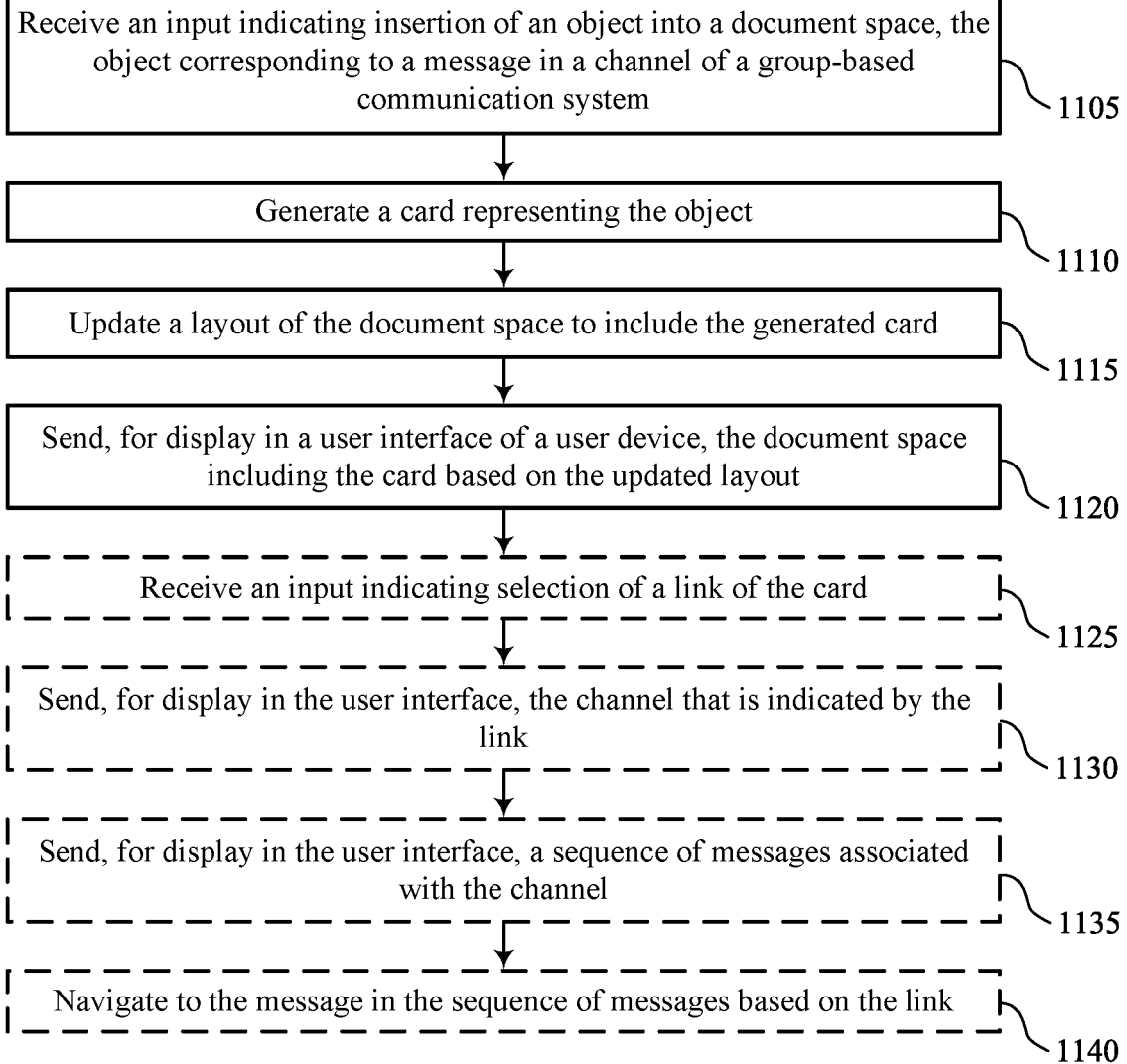

Receive an input indicating insertion of an object into a document space, the object corresponding to a message in a channel of a group-based communication system
1105

Generate a card representing the object
1110

Update a layout of the document space to include the generated card
1115

Send, for display in a user interface of a user device, the document space including the card based on the updated layout
1120

Receive an input indicating selection of a link of the card
1125

Send, for display in the user interface, the channel that is indicated by the link
1130

Send, for display in the user interface, a sequence of messages associated with the channel
1135

Navigate to the message in the sequence of messages based on the link
1140

AUTOMATIC LAYOUT UPDATES FOR DOCUMENT SPACES IN A GROUP-BASED COMMUNICATION SYSTEM

TECHNICAL FIELD

The present disclosure relates generally to communication systems and data processing, and more specifically to automatic layout updates for document spaces in a group-based communication system.

A cloud platform (i.e., a computing platform for cloud computing) may be employed by multiple users to store, manage, and process data using a shared network of remote servers. Users may develop applications on the cloud platform to handle the storage, management, and processing of data. In some cases, the cloud platform may utilize a multi-tenant database system. Users may access the cloud platform using various user devices (e.g., desktop computers, laptops, smartphones, tablets, or other computing systems, etc.).

Users may communicate information using a communication platform (e.g., a group-based communication system, separate from or associated with the cloud platform). In some examples, the group-based communication system may support different groups of users sharing content within specific channels. Such channels may display posts (e.g., messages, files, images) in sequential order according to timestamps. However, a sequential listing of posts may be relatively inflexible, failing to support users rearranging the layout of information, what information is displayed, or both. In some cases, a sequential listing of posts may effectively obfuscate important information from users and may fail to provide low-latency access to important resources associated with a channel.

SUMMARY

The described techniques relate to improved methods, systems, devices, and apparatuses that support automatic layout updates for document spaces in a group-based communication system. A document space may be an example of a collaborative space (e.g., a document or file) that may display objects, text, or any other information defined by a user editing the document space. Some document spaces may be associated with specific group-based channels for the group-based communication system, while other document spaces may be standalone documents unassociated with a channel. The group-based communication system may support automatic updates to the layout of a document space in response to user inputs, such as adding a new object to the document space or rearranging the objects within the document space. For example, if a user adds an object (e.g., a group-based communication message, a file, an image, an external link, a workflow, an application or integration) into the document space, the system may generate a card representing the object. In some examples, the card may include a link to a resource external to the document space and a preview image for the object, where the preview image may be rendered based on unfurling the link (e.g., in an inline frame (iframe) or by retrieving a subset of information from the target of the link). The group-based communication system may update the layout of the document space to include the generated card and may send, for display in a user interface (UI) of a user device, the updated layout for the document space. The UI according to aspects of the invention may be a graphical user interface (GUI) or other type of interface. In some cases, a user may select the card to reposition the card within the UI, such as by dragging-and-dropping the card from a first position to a new position within the document space. The system may further update the layout of the document space based on the repositioning of the card. For example, the system may automatically resize (and in some cases, further reposition) the card, one or more other cards in the document space, or both based on the repositioning. Additionally, or alternatively, the system may automatically add an additional column, add an additional row, remove a column, remove a row, create a new column layout, or any combination thereof in response to the repositioning.

One or more technical solutions described herein may solve one or more technical problems by providing an improved GUI with improved usability, functionality, and user experience for a group-based communication system. For example, the group-based communication system may support the flexible display of information within a document space, such that multiple users may edit the document space and may arrange objects (e.g., represented by cards) within the document space via an improved GUI. A user may prioritize the rendering of important information within the document space by moving a card displaying the information into a prominent position within the document space. Additionally, or alternatively, the document space may support rendering messages in non-sequential order (e.g., according to an arrangement of cards within the layout of the document space). In some cases, the document space may display messages from different channels of the group-based communication system in a shared space.

Furthermore, the document space may support low-latency access to multiple resources associated with the document space or associated with a channel corresponding to the document space. That is, one or more technical solutions described herein may solve one or more technical problems by improving a latency involved in accessing resources external to the group-based communication system, internal to the group-based communication system, or both by providing multiple different links (and, in some examples, previews of the link destinations) within a single space displayed via a GUI and allowing a user to rearrange the links, add new links, or both. In other systems, accessing such resources may involve navigating through multiple webpages, views, channels (e.g., in the group-based communication system), or some combination thereof. As described herein, the document space may provide cards supporting one or more links to specific aspects of the group-based communication system or other resources. For example, a card may support a link to a specific message within a channel, a specific user profile, a specific webpage, a specific application, or any other resource external to the document space. By including multiple cards in the document space, users may quickly navigate between relevant resources within the group-based communication system and relevant resources external to the group-based communication system from a single, shared space. If new resources become relevant to the document space or the channel, users can add new objects to the document space that link to the new resources. In some examples, the document space may display dynamic information relating to one or more channels and may provide an interface in which users can highlight important aspects of a channel, perform operations associated with the channel, or both to improve the user experience and functionality of the group-based communication system.

BRIEF DESCRIPTION OF THE DRAWINGS

FIGS. 10 through 12 illustrate flowcharts showing methods that support automatic layout updates for document spaces in a group-based communication system in accordance with aspects of the present disclosure.

DETAILED DESCRIPTION

Figure 1:
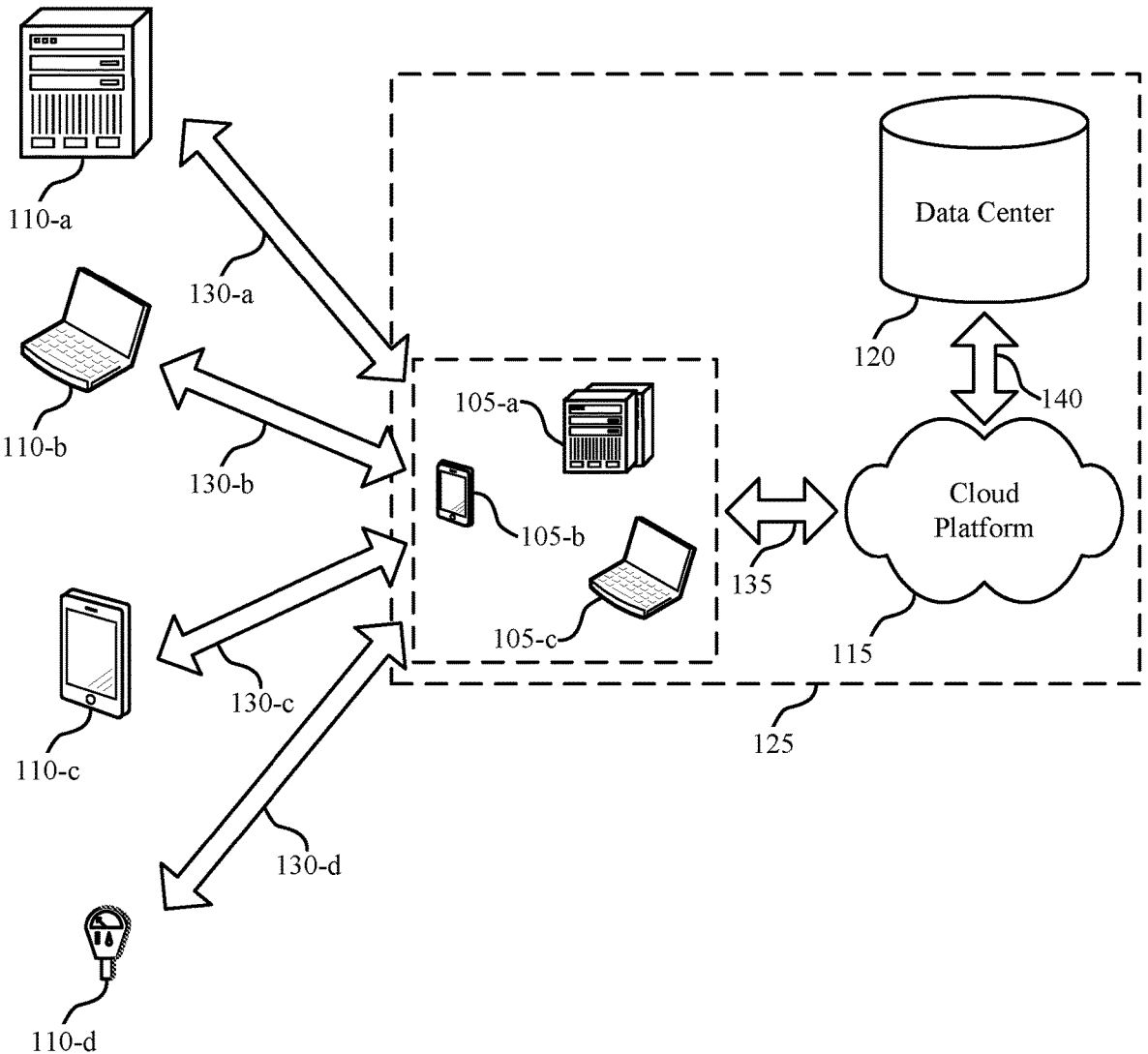
FIG. 1 illustrates an example of a system for cloud computing that supports automatic layout updates for document spaces in a group-based communication system in accordance with aspects of the present disclosure.

A group-based communication system may provide access to a group-based communication platform, which may in turn support multiple group-based communication channels. A group-based communication channel may provide a virtual space in which users of a group may communicate, for example, by posting messages, entering hangout meetings, performing calls, sharing files, or communicating using any other means. In some systems, an organization (e.g., a tenant of a multi-tenant database system or another organization or team) may use multiple different channels within the group-based communication platform. A channel may support a sequential listing of posts (e.g., messages, files, images) that were posted to the channel by users with access to the channel. However, in some cases, a sequential listing of posts may be relatively inflexible, failing to support users rearranging the layout of information, modifying which information is displayed in a prominent position, or both. Supporting spaces with flexible layouts and dynamic information within the group-based communication system may improve user experience and reduce latency involved in navigating the channels and other resources internal to—and, in some cases, external to—the group-based communication system.

Techniques described herein may support automatic layout updates for document spaces in a group-based communication system. The automatic layout updates may provide users flexibility in what information is displayed within a document space and how the information is displayed within the document space. The document space may be an example of a collaborative space (e.g., a document or file) stored for the group-based communication system that may display objects, text, or any other information defined by a user editing the document space. In some examples, a document space may be associated with a specific group-based communication channel (e.g., providing summary information or other details associated with the channel). In some other examples, a document space may be a standalone document unassociated with a specific group-based communication channel. The group-based communication system may support automatic updates to the layout of a document space in response to user inputs. For example, if a user adds an object (e.g., a group-based communication message, a file, an image, an external link, a workflow, an application or integration) into the document space, the system may generate a card representing the object. In some examples, the card may include a link to a resource external to the document space and a preview image for the object, where the preview image may be rendered based on unfurling the link (e.g., in an inline frame (iframe) or by retrieving a subset of information from the target of the link). The group-based communication system may update the layout of the document space to include the generated card, for example, by adding an additional column, adding an additional row, resizing the cards currently included in the document space, rearranging the cards currently included in the document space, or any combination thereof. The group-based communication system may send, for display in a user interface (UI) of a user device, the updated layout for the document space. In some cases, a user may select to reposition the card within the UI, such as by dragging-and-dropping the card within the document space. The system may further update the layout of the document space based on the repositioning of the card. The card may support one or more links to resources external to the document space. For example, the card may include a link to a specific message within a channel of the group-based communication system, a link to a specific user profile of a user in the group-based communication system, a link to a specific webpage, a link to a specific application or integration, or any other links relevant to an object added to the document space. Such links may provide relatively low-latency access to multiple different resources from the cards displayed in the document space.

Aspects of the disclosure are initially described in the context of an environment supporting an on-demand database service. Additional aspects of the disclosure are described with reference to group-based communication systems and UIs. Aspects of the disclosure are further illustrated by and described with reference to apparatus diagrams, system diagrams, and flowcharts that relate to automatic layout updates for document spaces in a group-based communication system.

FIG. 1 illustrates an example of a system 100 for cloud computing that supports automatic layout updates for document spaces in a group-based communication system in accordance with various aspects of the present disclosure. The system 100 includes cloud clients 105, contacts 110, cloud platform 115, and data center 120. Cloud platform 115 may be an example of a public or private cloud network. A cloud client 105 may access cloud platform 115 over network connection 135. The network may implement transfer control protocol and internet protocol (TCP/IP), such as the Internet, or may implement other network protocols. A cloud client 105 may be an example of a user device, such as a server (e.g., cloud client 105-*a*), a smartphone (e.g., cloud client 105-*b*), or a laptop (e.g., cloud client 105-*c*). In other examples, a cloud client 105 may be a desktop computer, a tablet, a sensor, or another computing device or system capable of generating, analyzing, transmitting, or receiving communications. In some examples, a cloud client 105 may be operated by a user that is part of a business, an enterprise, a non-profit, a startup, or any other organization type.

A cloud client 105 may interact with multiple contacts 110. The interactions 130 may include communications, opportunities, purchases, sales, or any other interaction between a cloud client 105 and a contact 110. Data may be associated with the interactions 130. A cloud client 105 may access cloud platform 115 to store, manage, and process the data associated with the interactions 130. In some cases, the cloud client 105 may have an associated security or permission level. A cloud client 105 may have access to certain applications, data, and database information within cloud platform 115 based on the associated security or permission level and may not have access to others.

Contacts 110 may interact with the cloud client 105 in person or via phone, email, web, text messages, mail, or any other appropriate form of interaction (e.g., interactions 130-a, 130-b, 130-c, and 130-d). The interaction 130 may be a business-to-business (B2B) interaction or a business-to-consumer (B2C) interaction. A contact 110 may also be referred to as a customer, a potential customer, a lead, a client, or some other suitable terminology. In some cases, the contact 110 may be an example of a user device, such as a server (e.g., contact 110-a), a laptop (e.g., contact 110-b), a smartphone (e.g., contact 110-c), or a sensor (e.g., contact 110-d). In other cases, the contact 110 may be another computing system. In some cases, the contact 110 may be operated by a user or group of users. The user or group of users may be associated with a business, a manufacturer, or any other appropriate organization and/or team.

Cloud platform 115 may offer an on-demand database service to the cloud client 105. In some cases, cloud platform 115 may be an example of a multi-tenant database system. In this case, cloud platform 115 may serve multiple cloud clients 105 with a single instance of software. However, other types of systems may be implemented, including—but not limited to—client-server systems, mobile device systems, and mobile network systems. In some cases, cloud platform 115 may support CRM solutions. This may include support for sales, service, marketing, community, analytics, applications, and the Internet of Things. Cloud platform 115 may receive data associated with contact interactions 130 from the cloud client 105 over network connection 135 and may store and analyze the data. In some cases, cloud platform 115 may receive data directly from an interaction 130 between a contact 110 and the cloud client 105. In some cases, the cloud client 105 may develop applications to run on cloud platform 115. Cloud platform 115 may be implemented using remote servers. In some cases, the remote servers may be located at one or more data centers 120.

Data center 120 may include multiple servers. The multiple servers may be used for data storage, management, and processing. Data center 120 may receive data from cloud platform 115 via connection 140, or directly from the cloud client 105 or an interaction 130 between a contact 110 and the cloud client 105. Data center 120 may utilize multiple redundancies for security purposes. In some cases, the data stored at data center 120 may be backed up by copies of the data at a different data center (not pictured).

Subsystem 125 may include cloud clients 105, cloud platform 115, and data center 120. In some cases, data processing may occur at any of the components of subsystem 125, or at a combination of these components. In some cases, servers may perform the data processing. The servers may be a cloud client 105 or located at data center 120.

The system 100 may be an example of a multi-tenant system. For example, the system 100 may store data and provide applications, solutions, or any other functionality for multiple tenants concurrently. A tenant may be an example of a group of users (e.g., an organization, a team) associated with a same tenant identifier (ID) who share access, privileges, or both for the system 100. The system 100 may effectively separate data and processes for a first tenant from data and processes for other tenants using a system architecture, logic, or both that support secure multi-tenancy. In some examples, the system 100 may include or be an example of a multi-tenant database system. A multi-tenant database system may store data for different tenants in a single database or a single set of databases. For example, the multi-tenant database system may store data for multiple tenants within a single table (e.g., in different rows) of a database. To support multi-tenant security, the multi-tenant database system may prohibit (e.g., restrict) a first tenant from accessing, viewing, or interacting in any way with data or rows associated with a different tenant. As such, tenant data for the first tenant may be isolated (e.g., logically isolated) from tenant data for a second tenant, and the tenant data for the first tenant may be invisible (or otherwise transparent) to the second tenant. The multi-tenant database system may additionally use encryption techniques to further protect tenant-specific data from unauthorized access (e.g., by another tenant).

Additionally, or alternatively, the multi-tenant system may support multi-tenancy for software applications and infrastructure. In some cases, the multi-tenant system may maintain a single instance of a software application and architecture supporting the software application in order to serve multiple different tenants (e.g., organizations, teams, customers). For example, multiple tenants may share the same software application, the same underlying architecture, the same resources (e.g., compute resources, memory resources), the same database, the same servers or cloud-based resources, or any combination thereof. For example, the system 100 may run a single instance of software on a processing device (e.g., a server, server cluster, virtual machine) to serve multiple tenants. Such a multi-tenant system may provide for efficient integrations (e.g., using application programming interfaces (APIs)) by applying the integrations to the same software application and underlying architectures supporting multiple tenants. In some cases, processing resources, memory resources, or both may be shared by multiple tenants.

As described herein, the system 100 may support any configuration for providing multi-tenant functionality. For example, the system 100 may organize resources (e.g., processing resources, memory resources) to support tenant isolation (e.g., tenant-specific resources), tenant isolation within a shared resource (e.g., within a single instance of a resource), tenant-specific resources in a resource group, tenant-specific resource groups corresponding to a same subscription, tenant-specific subscriptions, or any combination thereof. The system 100 may support scaling of tenants within the multi-tenant system, for example, using scale triggers, automatic scaling procedures, scaling requests, or any combination thereof. In some cases, the system 100 may implement one or more scaling rules to enable relatively fair sharing of resources across tenants. For example, a tenant may have a threshold quantity of processing resources, memory resources, or both to use, which in some cases may be tied to a subscription by the tenant.

In some examples, the system 100 may further support a group-based communication system. For example, a group-based communication system may provide a platform for users to communicate within groups defined by group-based communication channels. The group-based communication system may leverage one or more aspects of the subsystem 125. For example, data objects stored in the data center 120, the cloud platform 115, or both may be accessed or otherwise referenced within a channel of the group-based communication system. Additionally, or alternatively, the cloud platform 115 may support a group-based communication platform.

A group-based communication platform may support document spaces that provide users with flexible spaces for displaying objects (e.g., messages, links, images, files) in a rearrangeable format. In some cases, a document space may be associated with a specific channel. In some other cases, the document space may be a document unassociated with a channel. A user may access the document space and may edit the document space by adding an object to the document space, removing an object from the document space, repositioning a card representing an object in the document space, or any combination thereof. In some cases, the document space may display information relating to a database system (e.g., a multi-tenant database system). For example, an object may link to a resource in a CRM platform. In some examples, a card in the document space may display data or other aggregate information relating to a CRM solution by linking to the database system.

Some other systems may provide collaborative documents for users to concurrently access and modify. However, such systems may fail to support multiple links to different external resources within the collaborative documents. Furthermore, these links may fail to provide previews of the external resources, reducing the usability of the collaborative documents. Additionally, the collaborative documents may fail to support drag-and-drop functionality that is easy to use and provides clear visual indicators of how moving information in a document will affect other information in the document.

In contrast, the system 100 may support a group-based communication platform that provides functionality for documents spaces. The document spaces may support drag-and-drop functionality for adding objects to a document space and repositioning cards representing objects within the document space. Additionally, the cards may support links to resources external to the document space. In some examples, a card may support one or more links to resources within the group-based communication platform (e.g., messages, user profiles, channels, workspaces, direct messages, calls). Additionally, or alternatively, the card may support one or more links to resources external to the document space (e.g., webpages, applications). Such links may provide relatively low-latency access to multiple resources from a single, shared document space. The document space may additionally "unfurl" a link to provide a preview of the link's destination. This preview may update if the destination updates, providing a realtime (or according to some aspects of this disclosures, a near-realtime) view of the link's destination, improving user experience and providing accurate information to users viewing the document space.

It should be appreciated by a person skilled in the art that one or more aspects of the disclosure may be implemented in a system 100 to additionally or alternatively solve other problems than those described above. Furthermore, aspects of the disclosure may provide technical improvements to "conventional" systems or processes as described herein.

However, the description and appended drawings only include example technical improvements resulting from implementing aspects of the disclosure, and accordingly do not represent all of the technical improvements provided within the scope of the claims.

Figure 2:
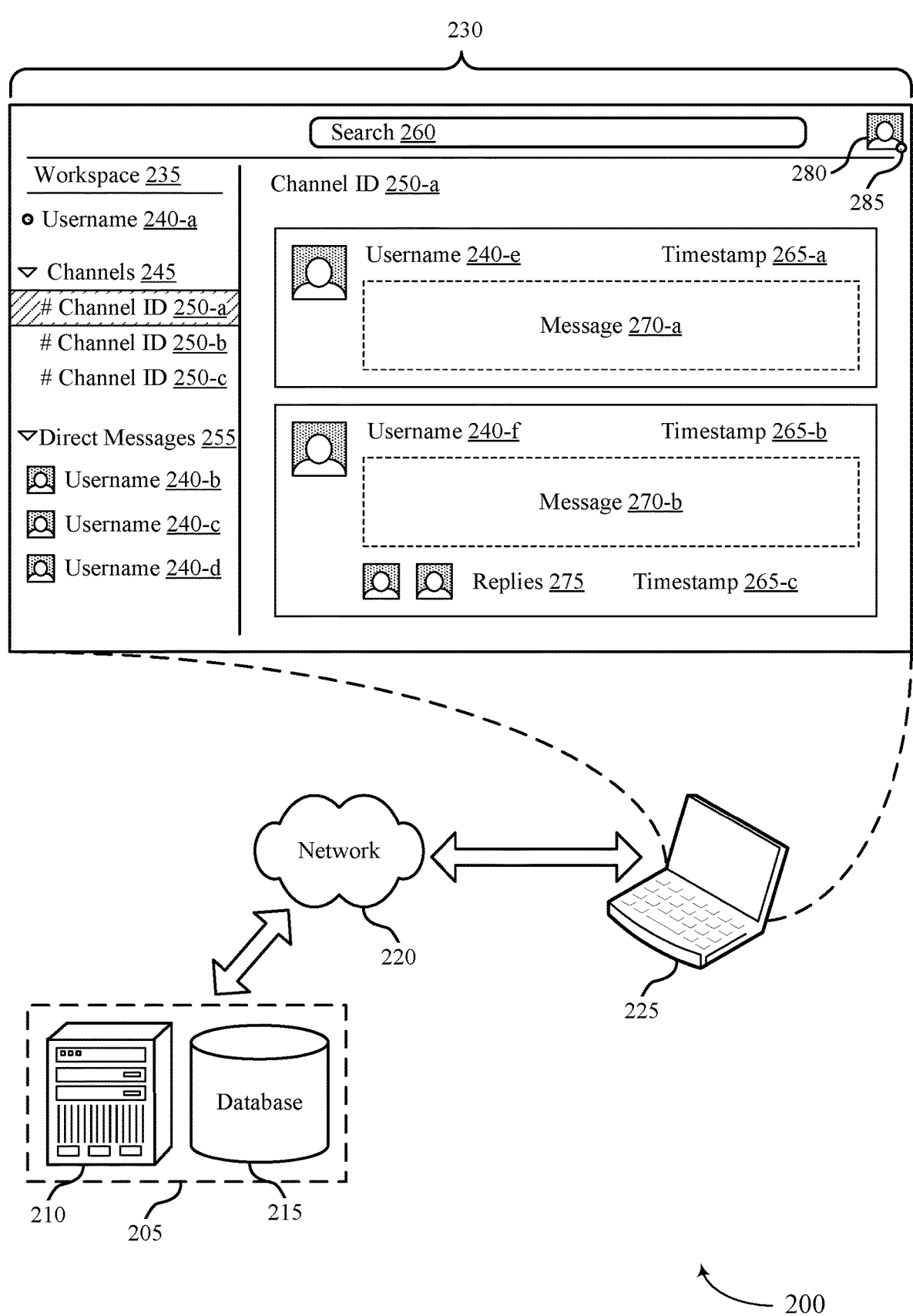
FIG. 2 illustrates an example of a group-based communication system that supports automatic layout updates for document spaces in the group-based communication system in accordance with aspects of the present disclosure.

FIG. 2 illustrates an example of a group-based communication system 200 that supports automatic layout updates for document spaces in a group-based communication system in accordance with aspects of the present disclosure. The group-based communication system 200 may be implemented as part of or with a system 100. For example, the group-based communication system 200 may leverage data stored at a cloud platform 115, a data center 120, or some combination thereof. The group-based communication system 200 may include a group-based communication platform 205 hosted by one or more computing devices 210, databases 215, or a combination thereof. The group-based communication system 200 may support displaying data to a user via a UI 230 (e.g., a graphical user interface (GUI)) of a user device 225. In some examples, the user device 225 may communicate with the group-based communication platform 205 via a network 220. In some cases, the user device 225 may be an example of a cloud client 105 or a contact 110 in a system 100, as described with reference to FIG. 1.

The group-based communication platform 205 may leverage a network-based computing system to enable users of the group-based communication platform 205 to exchange data. By being "group-based," the platform may support communication channels, messages, virtual spaces, or a combination thereof organized into groups of users. The group-based communication platform 205 may include security policies or features that define access to resources (e.g., channels, messages) according to such groups. In some examples, the groups of users may be defined by group IDs, which may be associated with common access credentials, domains, or the like. In some examples, the group-based communication platform 205 may provide a virtual space enabling users to chat, meet, call, collaborate, transfer files or other data, or otherwise communicate within groups. In some examples, a group may be associated with a workspace 235 or team, enabling users associated with the group to communicate within the group in a secure and private virtual space. In some cases, members of a group, a workspace, or a team may be associated with a same organization (e.g., a tenant of a multi-tenant database system). In some other cases, members of a group or a workspace may be associated with different organizations (e.g., entities with different organization IDs, such as different tenants in a multi-tenant database system).

One or more computing devices 210 may support the group-based communication platform 205. For example, the one or more computing devices 210 may include an application server, a database server, a cloud-based server or service, a worker server, a server cluster, a virtual machine, a container, or any combination of these or other computing devices supporting data processing. For example, the one or more computing devices 210 may include one or more processors, memory, computer-readable media, or a combination thereof. The one or more computing devices 210 may perform functions and provide features as described herein with respect to the group-based communication platform 205. The group-based communication platform 205 may further include one or more databases 215, which may include cloud-based data storage, physical data storage, or both. In some cases, the one or more databases 215 may be memory components of the one or more computing devices 210. The one or more databases 215 may store data associated with the group-based communication platform 205. For example, the one or more databases 215 may include data relating to channels, users, workspaces 235, or any combination thereof, logs of messages 270, security information, or any other information relevant to the group-based communication platform 205.

A user may access the group-based communication platform 205 using a user device 225. The user device 225 may be an example of a laptop, a desktop computer, a smartphone, a tablet, a smart device, or any other device operated by a user and including a UI 230. The user device 225 may communicate with the group-based communication platform 205, for example, via a network 220. The network 220 may be any type of communication network, such as a local area network or a wide area network, the Internet, a wireless network, a cellular network, a local wireless network, Wi-Fi, Bluetooth®, Bluetooth Low Energy (BLE), Near Field Communication (NFC), a wired network, or any combination of these or other networks. The network 220 may support proper network protocols for transferring data between the user device 225 and the group-based communication platform 205. For example, the user device 225, the group-based communication platform 205, or both may apply one or more security protocols (e.g., encryption) for securely transferring data over the network 220. In some cases, one or more aspects of the group-based communication platform 205 may be implemented at the user device 225. For example, the user device 225 may download an application corresponding to the group-based communication platform 205 and may store information relating to the group-based communication platform 205 locally at the user device 225. In some other examples, the user device 225 may access the group-based communication platform 205 in a web browser.

The user device 225 may include a UI 230 that may display information relating to the group-based communication platform 205. The UI 230 may be an example of a GUI for the user device 225. A user may interact with the UI 230 to communicate with other users, view data, modify data, or otherwise perform actions associated with the group-based communication platform 205. The group-based communication platform 205 may support multiple group-based communication channels, and the UI 230 may display information relating to a group-based communication channel corresponding to a channel ID 250-*a*. The UI 230 may display a sidebar including navigation information for a user and a central pane (e.g., a main pane) including the channel contents, such as a sequential listing of messages 270 corresponding to the channel ID 250-*a*. A channel (e.g., a group-based communication channel) may provide a virtual space for a group of users to communicate via messages, hangouts, video or audio calls, files, or any other means of communication. The group of users may include members of the channel, non-members of the channel with access to the channel, or both.

A user may log into the group-based communication platform 205 (e.g., using a username 240-*a*, a password, or both corresponding to a user account). In response to the user logging in, the group-based communication platform 205 may send, for display in the UI 230, data corresponding to the user (e.g., corresponding to an account for the user). For example, the user may be associated with a specific workspace 235, a set of channels 245, a set of connections, a set of threads, a set of direct messages 255, or any combination of these. The user device 225 may retrieve or otherwise access the relevant information for the user (e.g., based on the username 240-*a* or another user ID) and surface the information for display in the UI 230 according to a display format.

As an example, in a sidebar (e.g., a navigation pane), the UI 230 may display an indication of a workspace 235 corresponding to the user and the username 240-*a* of the user. The sidebar may further include indications of a set of channels 245 using the respective channel IDs. For example, the set of channels 245 may include the channels to which the user is a member. As illustrated, the set of channels 245 may include a first channel corresponding to a first channel ID 250-*a*, a second channel corresponding to a second channel ID 250-*b*, and a third channel corresponding to a third channel ID 250-*c*. It is to be understood that the set of channels 245 may include any quantity of channels for selection by the user. The user may select a channel from the listing of the set of channels 245, and the UI 230 may display the selected channel (e.g., the messages 270 associated with the selected channel) in the central pane. The sidebar may further include a set of direct messages 255 between the user with the username 240-*a* and one or more other users (e.g., in a DM group). For example, the set of direct messages 255 may include the usernames 240 (or nicknames) of the users communicating via direct messages with the user. In some examples, the list of users may include users added by the user with username 240-*a*, users who have current, ongoing direct message conversations with the user with username 240-*a*, or both. As illustrated, the set of direct messages 255 may include indications of a user with a first username 240-*b*, a user with a second username 240-*c*, and a user with a third username 240-*d*, although any quantity of users may be included in the set of direct messages 255. Selecting a username 240 from the set of direct messages 255 may cause the UI 230 to display a set of direct messages between the logged in user and the selected user or group of users in the central pane (e.g., direct messages that are stored in the system and displayed in a sequential order).

The central pane of the UI 230 may display the contents of a selected channel. For example, if the user selects a channel with a channel ID 250-*a*, the central pane may display the selected channel ID 250-*a*, as well as data corresponding to this selected channel ID 250-*a*. The data for the channel may include a sequential listing of messages 270 posted to the channel. For example, a user with a username 240-*e* may post a first message 270-*a* at a first time corresponding to a timestamp 265-*a*. The UI 230 may display, for the channel, this information, as well as affordances supporting actions associated with this information. For example, a user may react to the message 270-*a*, reply to the message 270-*a*, or both. As illustrated, another user with a username 240-*f* may post a second message 270-*b* at a time corresponding to a timestamp 265-*b*, and one or more users may reply to the message 270-*b*. The UI 230 may indicate a set of replies 275 and one or more timestamps 265-*c* associated with the replies 275 (e.g., a timestamp 265-*c* corresponding to a most recent reply) with the message 270-*b*. Selecting the set of replies 275 may cause the UI 230 to display the replies in a second sidebar (e.g., as a thread of messages).

The messages 270 may include text or other objects, such as files, photos, audio files, video files, documents, uniform resource locator (URL) links, or any other objects. If the selected channel is private, members of the channel may view the information related to the channel, while nonmembers of the channel may be blocked from viewing the information. If the selected channel is public, members and nonmembers of the channel may view the relevant information. In some cases, channels, users, workspaces 235, accounts, or some combination thereof may include accessibility settings or rules which may define viewing capabilities, editing capabilities, or both.

The UI 230 may further support search functionality using a search bar 260. Additionally, or alternatively, the UI 230 may indicate a profile picture 280 of the currently logged in user, as well as a connection status 285 (e.g., online, offline, busy) of the user.

In some cases, the group-based communication platform 205 may additionally support document spaces. A document space may be associated with a specific workspace 235, a specific channel 245, or both. Some document spaces may be public (e.g., accessible by any users of the group-based communication platform 205), while other document spaces may be private (e.g., accessible by a defined set of users of the group-based communication platform 205). The document spaces may support automatic layout updates in response to user inputs (e.g., adding new objects, removing objects, rearranging information in a document space) as described herein.

Figure 3:
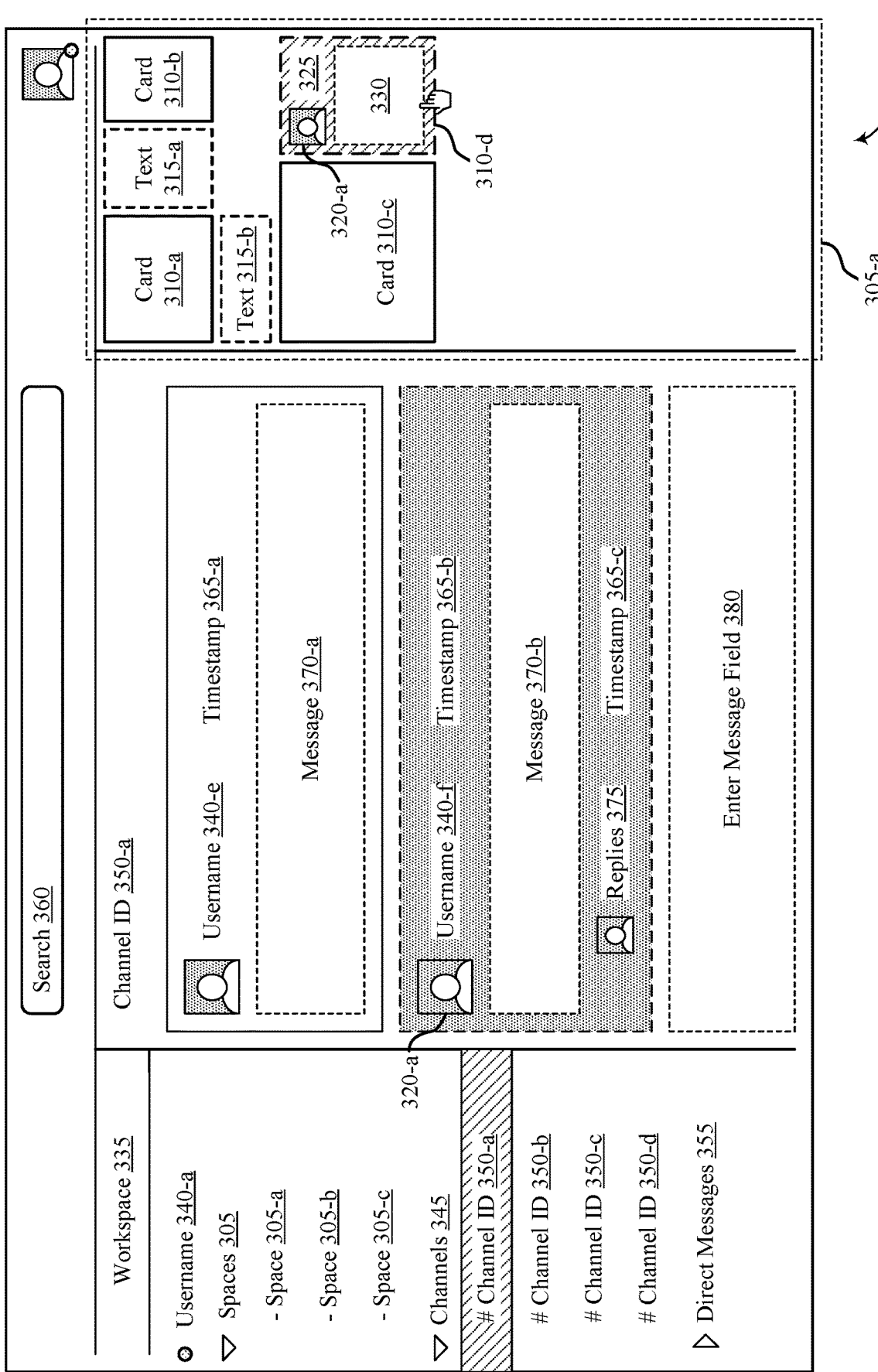
FIGS. 3, 4A, and 4B illustrate examples of user interfaces (UIs) that support automatic layout updates for document spaces in a group-based communication system in accordance with aspects of the present disclosure.

FIG. 3 illustrates an example of a UI 300 that supports automatic layout updates for document spaces in a group-based communication system in accordance with aspects of the present disclosure. The UI 300 may be an example of a UI 230 for a group-based communication system 200 as described with reference to FIG. 2. A user device, such as a cloud client 105 or a user device 225 described herein with reference to FIGS. 1 and 2, may present the UI 300 (e.g., as a GUI). The UI 300 may display information relating to a group-based communication platform. For example, the UI 300 may display a document space 305-*a* including one or more cards, text blocks, or both. The UI 300 may support a user modifying the layout of the document space 305-*a*, including support for drag-and-drop features. In some cases, as illustrated, the UI 300 may concurrently display the document space 305-*a* with a sequential listing of messages for the channel. For example, the UI 300 may include a first sidebar including navigation information for a user, a central pane including channel contents (e.g., the sequential listing of messages corresponding to a channel ID 350-*a*), and a second sidebar including the document space 305-*a*. Alternatively, the document space 305-*a* may be displayed in the central pane. For example, a user may select an affordance (e.g., a button) to expand the document space 305-*a* from a sidebar to the central pane. In some examples, the document space 305-*a* may be displayed as a floating card in the UI 300.

The user device including the UI 300 may communicate with the group-based communication platform (e.g., over a network, using a downloaded application). For example, the user device may receive, from the group-based communication platform, data to display in the UI 300. The user device may further send, to the group-based communication platform, user inputs received via the UI 300. For example, a user operating the user device may interact with features of the UI 300 to view specific channels, post messages, send direct messages 355 to other users, perform searches (e.g., using a search bar 360), modify the document space 305-*a*, or any combination of these or other actions supported by the UI 300.

A user may log into the group-based communication system using a username 340-*a*. In some examples, the user may view a channel corresponding to a channel ID 350-*a*. For example, the navigation pane in the first sidebar may indicate a workspace 335 for the user, a set of channels 345 for the user, including a channel ID 350-*a*, a channel ID

350-*b*, a channel ID 350-*c*, and a channel ID 350-*d*, and set of direct messages 355 for the user. Additionally, or alternatively, the navigation pane in the first sidebar may indicate a set of document spaces 305 for the user, including a document space 305-*a*, a document space 305-*b*, and a document space 305-*c*.

In some cases, the UI 300 may display the contents of a selected channel (e.g., with the channel ID 350-*a*) in the central pane. For example, the selected channel may include a message 370-*a* posted by a user with a username 340-*e* at a timestamp 365-*a* and a message 370-*b* posted by a user with a username 340-*f* at a timestamp 365-*b*. The second message 370-*b* may be associated with a set of replies 375 with a most recent timestamp 365-*c*. The central pane may further include an affordance 380 for posting messages to the channel. The affordance 380 may include one or more features for posting messages, which may support typing a message, adding a link, attaching a file (e.g., a photo, a document, a video, an audio recording), copying a user, or the like.

If a document space 305-*a* is associated with the channel with the channel ID 350-*a*, the UI 300 may further display the document space 305-*a* (e.g., in a sidebar or elsewhere) corresponding to the selected channel (e.g., corresponding to the channel ID 350-*a*). The document space 305-*a*—which may additionally, or alternatively, be referred to as a canvas, a channel space, or a channel about page—may include one or more cards, one or more text blocks, or a combination thereof presenting information related to the channel. Some information presented in the document space 305-*a* (e.g., some text, some cards) may be auto-generated for the document space 305-*a*. For example, upon creation of the channel with the channel ID 350-*a*, the group-based communication system may additionally create the corresponding document space 305-*a* with auto-generated information. Additionally, or alternatively, a user may add, remove, or modify information in the document space 305-*a*. In some cases, the document space 305-*a* may be directly editable by any users of the channel (e.g., members of the channel or users with editing permissions for the channel). In some other cases, select users (e.g., administrative users, the channel creator) may be able to edit the document space 305-*a*, while other users may view the document space 305-*a* but may be restricted from editing the document space 305-*a*. For example, a team of users (e.g., a team defined within the group-based communication system) may access the document space 305-*a*.

A document space 305-*a* associated with a specific channel may be referred to as a channel space. One or more aspects of the document space 305-*a* may be controlled by one or more corresponding aspects of the channel. For example, users with access to the channel may automatically have access to the document space 305-*a*, while users without access to the channel may similarly not have access to the document space 305-*a*. Additionally, or alternatively, pinning a message in the channel may automatically add the message to the document space 305-*a* (e.g., as a card). Selecting to view the channel may automatically cause the UI 300 to additionally display the associated document space 305-*a*. Creation or deletion of the channel may trigger the corresponding creation or deletion of the associated document space 305-*a*.

Some document spaces 305 may be unassociated with a specific channel. Such document spaces 305 may be referred to as freeform spaces. A freeform space may be an example of a document type that allows multiple users to concurrently and collaboratively edit a document. A user may create such a document space 305 (e.g., the document space 305-*b*) within the group-based communication system or may add a previously-created document space 305 into the group-based communication system. A user may access freeform spaces, channel spaces, or both via a document spaces 305 navigation tool (e.g., in the navigation pane). In some cases, a user may embed a freeform space into a channel (e.g., within the sequential listing of messages). The channel may display a preview of the freeform space, a link to the freeform space, or both, and users accessing the channel may access the freeform space via the link.

A user may upload objects to the document space 305-*a*. In some cases, the document space 305-*a* may include an upload feature that supports a user browsing a set of files, folders, or both and selecting the files, folders, or both to upload to the document space 305-*a*. Additionally, or alternatively, the group-based communication system may support affordances (e.g., dropdown menus) on objects which support an "Add to Space" option. For example, a user may select the "Add to Space" affordance for a message, a file, an image, a workflow, a user profile, a channel, or any other object displayed in the UI 300 (e.g., in a channel, in a direct message 355). The document space 305-*a* may additionally support drag-and-drop functionality for adding objects to the document space 305-*a*. For example, a user may select an object to add to the document space 305-*a* (e.g., by left-clicking or otherwise normal-clicking on the object using a mouse or touchpad and holding down the left-click or normal-click), may drag the selected object to the document space 305-*a* (e.g., the area of the UI 300 displaying the document space 305-*a*), and may drop the object in the document space 305-*a* (e.g., by releasing the left-click or normal-click). The user may drag-and-drop an object from the group-based communication system (e.g., from a channel, from a direct message, from the navigation pane) or from an application or webpage external to the group-based communication system (e.g., from a user's desktop, from a folder).

Adding an object to the document space 305-*a* may trigger creation of a card in the document space 305-*a*. A card may be an example of an "unfurl card" or a "link unfurl card" representing the object added to the document space 305-*a*. Cards may support any object types supported by the document space 305-*a*. For example, a first card 310-*a* may display an image, a second card 310-*b* may display a link preview, a third card 310-*c* may display a file, and a fourth card 310-*d* may display a message 370-*b*. Other cards and card types may be supported by the document space 305-*a*. In some cases, a user may define support for additional card types (e.g., to support adding custom objects or custom fields to the document space 305-*a*, such as custom objects or custom fields from a database system).

A card may unfurl a link for display in the UI 300. Unfurling a link may involve retrieving a subset of information from the target of the link and displaying the subset of information within the card (e.g., as a link preview). For example, the second card 310-*b* may represent an external link to a website. The group-based communication system may retrieve, from the website, a subset of information representing the website or a most-recent state of the website. For example, the subset of information may include a name of the website, a logo for the website, a front page for the website, or any other information that supports displaying a portion of the website or displaying an image representing the website within the card 310-*b*. The group-based communication system may periodically or aperiodically request, from the website, any updates to the subset of information to keep the card up-to-date with a latest version or state of the website.

In some examples, the document space 305-*a* may be implemented using an inline frame (iframe). Additionally, or alternatively, the cards within the document space 305-*a* may be implemented using further iframes. That is, the card 310-*a* may be an example of an iframe displayed within another iframe (e.g., the iframe supporting the document space 305-*a*). The card may render information from an external resource (e.g., a website) by embedding a Hyper-Text Markup Language (HTML) page for the website into the document space 305-*a*. Alternatively, the card may render information from the group-based communication platform by embedding a page associated with the group-based communication platform (e.g., a channel, a message of a channel) into the document space 305-*a*. In some cases, the cards within the document space 305-*a* may be implemented using a composer for the group-based communication platform. For example, the group-based communication platform may support unfurl logic within a channel or a direct message (e.g., for files, images, links). The document space 305-*a* may use similar or the same unfurl logic within the cards.

A card may be a movable object presented in the document space 305-*a* UI. Adding the object to the document space 305-*a* may add the card into the layout for the document space 305-*a* (e.g., within a specific row and column). A user may drag the card to a different position within the layout to update the layout of the document space 305-*a*. A user may also use the card to link to another resource (e.g., external to the group-based communication platform or within the group-based communication platform). For example, the user may select a portion of the image preview within a card for an external link, and a web browser may navigate to the webpage indicated by the external link. Additionally, or alternatively, a card may link to a message within the group-based communication platform. For example, the card 310-*d* may represent the message 370-*b* (e.g., an object). The card 310-*d* may display a user profile picture 320-*a* corresponding to the user who posted the message 370-*b* (e.g., associated with the username 340-*f*), timestamp information 325 indicating the timestamp 365-*b*, a message preview 330 indicating the message 370-*b* (or at least a portion of the message 370-*b*), or any combination thereof. Selecting the user profile picture 320-*a* may cause the group-based communication system to display, in the UI 300 (e.g., a central pane of the UI 300 or a sidebar of the UI 300), a user profile for the user who posted the message 370-*b*. Selecting the timestamp information 325 may cause the group-based communication system to display, in the UI 300 (e.g., a central pane of the UI 300 or a sidebar of the UI 300), the message 370-*b*. For example, the UI 300 may display the channel in which the message 370-*b* was posted and may navigate through the sequence of messages to the message 370-*b*. Accordingly, in some cases, a card may hide one or more links but may support link functionality if a user selects a portion of the card (e.g., a message, an image, an icon).

The group-based communication system may store underlying data for a card displayed in the document space 305-*a*. For example, the group-based communication system may store a definition of the document space 305-*a* (e.g., a definition of an iframe). In some cases, the definition of the document space 305-*a* may be stored as a protocol buffer message. Adding an object to the document space 305-*a* may add a call to a function or a call to a definition of a card representing the object, which in some cases may be a call to an additional definition of an iframe. In some cases, adding an object may add a section to the definition of the document space 305-*a*, where each section may include a sequence number and a position. The position may define where the card is to be displayed relative to the other sections representing the other cards for the document space 305-*a*.

As an example, the section defining the card 310-*d* representing the message 370-*b* may include a link unfurl (e.g., a message unfurl, as compared to a file or webpage unfurl); an unfurl ID (e.g., including indicators of the workspace, channel, message, or some combination thereof); an author ID (e.g., linked to a user of the group-based communication platform, such as the user who posted the message 370-*b*); a URL referencing a permanent link to the message 370-*b* in the group-based communication platform, including the channel and the post sequence number (e.g., which may be, or may operate as, a timestamp for a message within the sequence of messages or posts); or any combination thereof. As an additional example, the section defining the card 310-*a* representing an image may include a link to the image (e.g., a file ID for an image file stored at a server for the group-based communication system); original dimensions for the image, which may be used for auto-sizing the image; or both.

Additionally, or alternatively, a user may add text to the document space 305-*a* (e.g., directly to the document space 305-*a*). For example, the user may type the text in a textbox within the document space 305-*a*. Adding text to the document space 305-*a* may create a text object similar to a card. For example, users may reposition the text object, delete the text object, edit the text object, or any combination thereof, and the document space 305-*a* may display the text object within the layout (e.g., aligned with one or more cards, one or more other text objects, or both). A single text object may include one or more paragraphs of text, a list of bullet points, one or more symbols or emojis, one or more links (e.g., URL links), or any combination thereof. For example, the document space 305-*a* may include text 315-*a* (e.g., aligned in a row with the card 310-*a* and the card 310-*b*) and text 315-*b* (e.g., aligned in a column with the card 310-*a*).

The group-based communication system may automatically update the layout of the document space 305-*a*. In some examples, the group-based communication system may perform auto-sizing on a card, a text object, or both. For example, the group-based communication system may automatically size a card or text object based on the contents of the column in which the card or text object is added. As illustrated in FIG. 3, the text 315-*b* may be auto-sized to match the width of the card 310-*a* based on the text 315-*b* being added to the same column as the card 310-*a*. In some cases, columns may be configured to take up proportional shares of the document space's width. Additionally, or alternatively, the group-based communication system may automatically cut off the text 315-*b* after a threshold quantity of characters or a threshold height of the text 315-*b*. If a user selects the text 315-*b*, the UI 300 may display the full text 315-*b*, but may otherwise display the subset of text 315-*b* according to the auto-sizing.

Additionally, or alternatively, a user may manually update the layout of the document space 305-*a*. For example, the user may resize a card, a text object, or both. The user may rearrange cards, text objects, or both, including adding an additional column, adding an additional row, adding an additional layout section, or any combination thereof. The document space 305-*a* may visually display drop zones supported for an object (e.g., where a card or text object may be dropped within the layout) using a visual affordance to indicate drop location availability. In some examples, the group-based communication system may restrict user updates based on one or more rules or thresholds for document spaces 305. For example, the group-based communication system may restrict the user from shrinking a card below a first size threshold, expanding a card beyond a second size threshold, or performing any other changes that conflict with the one or more rules or thresholds for document spaces 305 (e.g., restricting the user from modifying an aspect ratio for an image in the document space 305, restricting the user from exceeding a threshold quantity of columns or rows within the document space 305). The group-based communication system may follow similar rules or thresholds when automatically updating the layout of a document space 305.

In some cases, any user with access to the document space 305-*a* may edit the document space 305-*a*. In some other cases, a specific subset of users with access to the document space 305-*a* (e.g., the channel creator for the channel corresponding to the document space 305-*a*, members of the channel, the document space 305-*a* creator, administrative users, users with a specific set of permissions or meeting a threshold account level) may edit the document space 305-*a*, and the group-based communication system may restrict other users from editing the document space 305-*a*. Additionally, or alternatively, a user may lock design of the document space 305-*a*. For example, one or more users may design the document space 305-*a* (e.g., adding objects, arranging the objects) and a user may lock the design phase. While the design is locked, users may view the document space 305-*a* and may interact with the document space 305-*a* (e.g., selecting links). Additionally, the document space 305-*a* may automatically update while the design is locked (e.g., to show updates to messages or other information in the document space, such as updates to metrics tracked in the document space 305-*a*). However, while the design is locked, the group-based communication system may refrain from adding objects to the document space 305-*a*, removing objects from the document space 305-*a*, modifying the layout of the document space 305-*a*, or any combination thereof. In some examples, a user may unlock the design to further iterate on the design of the document space 305-*a*.

Figures 4A, 4B:
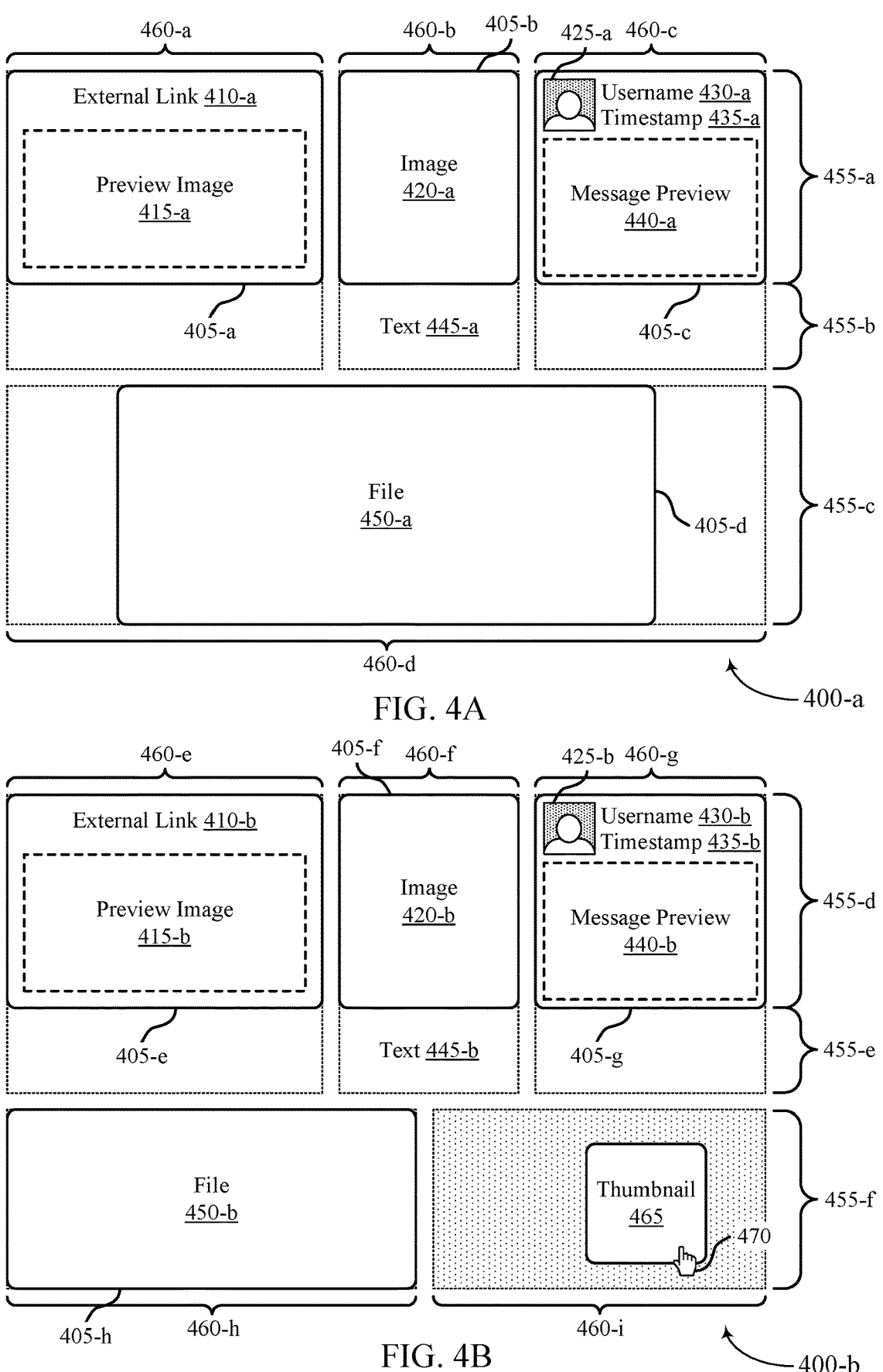

FIG. 4A illustrates an example of a UI 400-*a* that supports automatic layout updates for document spaces in a group-based communication system in accordance with aspects of the present disclosure. A user device, such as a user device described herein with reference to FIGS. 1 through 3, may display the UI 400-*a*. The UI 400-*a* may be an example of a GUI. The UI 400-*a* may display a document space, which may or may not be associated with a specific channel of a group-based communication system. The document space may be hosted by the group-based communication system. The document space may include a set of cards arranged according to one or more rows, one or more columns, or both. A user may rearrange the cards, add additional cards (e.g., by adding an object to the document space), remove cards, add text, or any combination thereof within the document space.

In some examples, a user may add an external link 410-*a* (e.g., an example of an object) to the document space. For example, the user may copy and paste the external link 410-*a* into the document space, may type the external link 410-*a* into the document space, may drag-and-drop the external link 410-*a* into the document space, or any combination thereof. The group-based communication system (e.g., a device, such as a computing device or a user device, running the group-based communication system) may generate a card 405-*a* representing the external link 410-*a*. The card 405-*a* may display the external link 410-*a* or an icon (e.g., an image, text) representing the external link 410-*a* supporting selection by a user in the UI 400-*a*. The card 405-*a* may additionally display a preview image 415-*a* of an external resource linked to by the external link 410-*a*. The external resource may be any resource external to the document space, the group-based communication system, or both. For example, the external link 410-*a* (e.g., a uniform resource locator (URL) link) may link to a specific webpage, an online document, or other resource on the web. The group-based communication system may additionally retrieve information (e.g., data) associated with the external resource to display in the preview image 415-*a*. In some cases, the group-based communication system may retrieve a subset of text from the external resource, an image (e.g., snapshot) from the external resource, or any other data associated with the external resource. For example, if the external link 410-*a* links to an online article, the preview image 415-*a* may display a snippet of text from the online article. In some examples, the group-based communication system may determine the subset of information to retrieve based on a size of the preview image 415-*a* to be displayed in the UI 400-*a*. Additionally, or alternatively, the group-based communication system may support periodically (e.g., according to a schedule) or aperiodically (e.g., upon some trigger, such as the document space being displayed or the layout of the document space being updated) updating the preview image 415-*a* by retrieving any updates to the information from the external resource (e.g., if the article has been modified, if the external resource is no longer accessible).

In some examples, the user may add an image 420-*a* (e.g., another example of an object) to the document space. For example, the user may copy and paste the image 420-*a* into the document space, may drag-and-drop the image 420-*a* into the document space, may upload the image 420-*a* into the document space, or any combination thereof. The group-based communication system may generate a card 405-*b* representing the image 420-*a*. For example, the card 405-*b* may include the image 420-*a*. The group-based communication system may automatically scale the image 420-*a* to fit within the UI 400-*a*. In some examples, the group-based communication system may maintain an aspect ratio for the image 420-*a* when scaling the image 420-*a*. In some cases, the group-based communication system may implement one or more rules for scaling the image 420-*a*. For example, the group-based communication system may include a threshold scaling factor (e.g., maximum scaling factor), such as 1.0 to refrain from enlarging images; a threshold width (e.g., minimum width), such as 150 pixels of width; a threshold height (e.g., a minimum height, a maximum height); or any combination thereof.

In some examples, the user may add a message (e.g., a group-based communication message from a group-based communication channel or a direct message channel) to the document space. For example, the user may drag-and-drop the message into the document space, select an affordance (e.g., a dropdown option) associated with the message that triggers adding the message to the document space, or any combination thereof. The group-based communication system may generate a card 405-*c* representing the message. The card 405-*c* may include a profile picture 425-*a* associated with the user who posted the message, the username

430-*a* of the user who posted the message, the timestamp 435-*a* indicating when the message was posted, a message preview 440-*a* (e.g., showing the contents of the message or a subset of the contents of the message), or any combination thereof. In some cases, the message preview 440-*a* may select a specific quantity of characters from the message to show based on a size of the card 405-*c* or the message preview 440-*a*.

The card 405-*c* representing the message (e.g., an object) may support links to one or more resources within the group-based communication system. For example, if a user selects the username 430-*a* or the profile picture 425-*a*, the group-based communication system may redirect the user to a user profile associated with the user who posted the message. The group-based communication system may send, for display via the UI 400-*a* (e.g., in a central pane of the UI 400-*a*, in a sidebar of the UI 400-*a*), a page associated with the user profile. Additionally, or alternatively, if the user selects the timestamp 435-*a* or the message preview 440-*a*, the group-based communication system may redirect the user to the message. For example, the group-based communication system may send, for display via the UI 400-*a* (e.g., in a central pane of the UI 400-*a*, in a sidebar of the UI 400-*a*), the group-based communication channel in which the message was posted. Additionally, the group-based communication system may navigate the user's view to the message in the sequence of messages posted to the group-based communication channel. For example, the group-based communication system may automatically scroll the channel view to the message corresponding to the card 405-*c*.

If the message is edited or deleted in the group-based communication channel, the group-based communication system may update the card 405-*c* in the document space. For example, the group-based communication system may update the message preview 440-*a* to show updated contents of an edited message. If the message is deleted from the channel, the group-based communication system may correspondingly delete the card 405-*c* from the document space or may otherwise indicate that the message is no longer available for viewing (e.g., using a default message or image in the message preview 440-*a*).

In some examples, a user may add text directly into the document space. For example, the user may type the text 445-*a* into the document space. In some cases, the document space may align the text 445-*a* with a column in the layout of the document space. In some examples, the document space may enforce a threshold height (e.g., maximum height) for text 445-*a*. For example, the document space may display a first subset of the text 445-*a* followed by an ellipsis. If a user selects the text, the document space may display the full text to the user in the UI 400-*a*.

In some examples, the user may add a file 450-*a* (e.g., an object) to the document space. For example, the user may drag-and-drop the file 450-*a* into the document space, select an affordance (e.g., a dropdown option) associated with the file 450-*a* that triggers adding the file 450-*a* to the document space, upload the file 450-*a* into the document space, or any combination thereof. The group-based communication system may generate a card 405-*d* representing the file 450-*a*. In some cases, the card 405-*d* may include a preview of the file 450-*a* (e.g., similar to the external link 410-*a* or the message). If a user selects the file 450-*a*, the group-based communication system may open the file for viewing by the user via the UI 400-*a*.

Additional, or alternative, types of objects (e.g., workflows, platform applications, or other objects) may be supported by the document space. For example, a workflow may be an example of a multi-step process defined for the group-based communication system, where the steps are arranged according to a specific order (e.g., a specific order for performing or otherwise processing the steps). Each step may be a fully-automated step performed by the group-based communication system, a manual step performed by a user, or a combination thereof (e.g., automation that depends on one or more user inputs). Some workflows may include decision points, such that a first subset of steps of the workflow is performed based on a first decision and a second subset of steps of the workflow is performed based on a second decision. The workflow may be data-driven (e.g., based on underlying data for the group-based communication system or a database system), user-driven (e.g., based on a user input triggering the workflow), or both. The workflow may support performing actions within the group-based communication system, for example, to respond to messages, interact with users, modify data, report an issue, or perform any combination of these or other actions in the group-based communication system. In some examples, a workflow may manage approvals, route tasks, trigger notifications, complete forms, or any combination thereof. A user may define a workflow (e.g., using a workflow builder application) or a workflow may be provided for multiple users, workspaces, or teams across the group-based communication system. The document space may include any combination of cards or card types representing any objects added to the document space.

The document space may be arranged according to a layout, such as a grid layout or gallery layout. The layout may be flexible, such that a user may rearrange cards, texts, or other information in the layout. Additionally, or alternatively, the user may define one or more rules for the layout. For example, the user may configure a quantity of columns for the layout, a threshold (e.g., maximum) quantity of columns for the layout (e.g., up to three columns), a quantity of rows for the layout, access information for the layout (e.g., defining which users have permission to modify the layout), or any combination thereof.

The layout of the document space may include one or more column layouts. For example, a first row 455-*a* and a second row 455-*b* may be configured with a first column layout (e.g., with three columns, displayed as flexbox columns), while a third row 455-*c* may be configured with a different column layout (e.g., with one column, a column 460-*d*). The document space layout may support any quantity of column layouts, where each row may follow any column layout. As illustrated, the first row 455-*a* and the second row 455-*b* may include a first column 460-*a*, a second column 460-*b*, and a third column 460-*c*. Each column may have a specific column width across one or more rows following the column layout. Additionally, or alternatively, different columns within a row may have the same column width or different column widths.

FIG. 4B illustrates an example of a UI 400-*b* that supports automatic layout updates for document spaces in a group-based communication system in accordance with aspects of the present disclosure. The UI 400-*b* may be an example of a GUI. The UI 400-*b* may support updating a document space layout from the document space layout described with reference to FIG. 4A. For example, a user may add an additional object to the document space described with reference to FIG. 4A. A user device, such as a user device described herein with reference to FIGS. 1 through 4A, may display the UI 400-*b*.

The document space displayed via the UI 400-*b* may include a first card 405-*e* representing an external link 410-*b* and including a preview image 415-*b*, a second card 405-*f* representing an image 420-*b*, a third card 405-*g* representing a group-based communication message (e.g., including a user profile picture 425-*b*, a username 430-*b*, a timestamp 435-*b*, and a message preview 440-*b*), and a fourth card 405-*h* representing a file 450-*b*. The document space may additionally include text 445-*b*. The first card 405-*e*, the second card 405-*f*, and the third card 405-*g* may be arranged within a first row 455-*d*, and the text 445-*b* may be arranged within a second row 455-*e*, where the first row 455-*d* and the second row 455-*e* are configured with a same column layout. For example, both the first row 455-*d* and the second row 455-*e* may be configured with a first column 460-*e*, a second column 460-*f*, and a third column 460-*g*. The fourth card 405-*h* may be arranged within a third row 455-*f*, and the third row 455-*f* may initially be configured with a single column (e.g., such as a column 460-*d* as described with reference to FIG. 4A) including the fourth card 405-*h*.

A user interacting with the UI 400-*b* via a user device may add a new object to the document space. The new object may be a message (e.g., a group-based communication message from a channel or direct message within a group-based communication system), an image, a file, an external link (e.g., an application link, a webpage link), a text block, a user profile (e.g., a link to the user profile within the group-based communication system), a channel (e.g., a link to a group-based communication channel within the group-based communication system), or any other object supported by the document space. Upon adding the object to the document space, the group-based communication system hosting the document space may generate a card representing the object. In some cases, the group-based communication system may automatically add the new card to a new row in the document space layout. In some other cases, the group-based communication system may automatically add the new card to a new column of an existing row in the document space layout. In yet some other cases, the group-based communication system may automatically add the new card to a new row of an existing column in the document space layout. Alternatively, if the user drags the object into the document space to add the object, the group-based communication system may dynamically determine where to add the generated card to the layout based on where the user drops the object within the layout.

The user may additionally or alternatively reposition the card within the document space layout. The user may select the card (e.g., with a mouse click, a touchpad selection, or other user input) and may reposition the card using the mouse 470, for example, while the mouse 470 remains clicked. For example, each card may include a portion of the card that supports drag-and-drop functionality for selecting and repositioning the card. The card may include a visual affordance that operates as a drag handle for dragging the card. In some cases, while the user is dragging the card, the UI 400-*b* may display a thumbnail 465 representing the card, the object represented by the card, or both. For example, if the card represents an image, the thumbnail 465 may show the image, a portion of the image, or an icon indicating that the card being dragged is an image. Similarly, if the card represents a message, the thumbnail 465 may show a portion of the message or may show a message icon. Additionally, or alternatively, the UI 400-*b* may display a name (e.g., an object name) near the mouse 470 as the user drags the card.

Depending on where the user drags the card, the group-based communication system may automatically update the layout of the document space in realtime or near-realtime. For example, based on the location of the mouse 470 dragging the card within the UI 400-*b*, the group-based communication system may determine a current location for dropping the card. Based on the current location, the group-based communication system may temporarily update the layout of the document space to show the user interacting with the UI 400-*b* how the document space would look if the card is dropped at this current location. If the user drops the card, the group-based communication system may update the layout of the document space (e.g., updating underlying metadata defining the layout of the document space).

Updating the layout of the document space may involve adding an additional column, adding an additional, resizing a column, resizing a row, or any combination thereof. The group-based communication system may automatically update the layout based on the previous layout and one or more aspects of the card being moved, the object represented by the card being moved, or both. For example, as illustrated in FIG. 4B, the user may drag the card to be added to the row 455-*f* previously including the card 405-*h*. The group-based communication system may automatically update the document space to include an additional column 460-*i* within the row 455-*f* Additionally, the group-based communication system may automatically resize the column 460-*h*, the row 455-*f*, or both based on the added card. For example, the group-based communication system may reduce the width of the column 460-*h* (e.g., as compared to the column 460-*d*) and may reduce the height of the row 455-*f* (e.g., as compared to the row 455-*c*) to maintain an aspect ratio of a card or an image.

Figure 5:
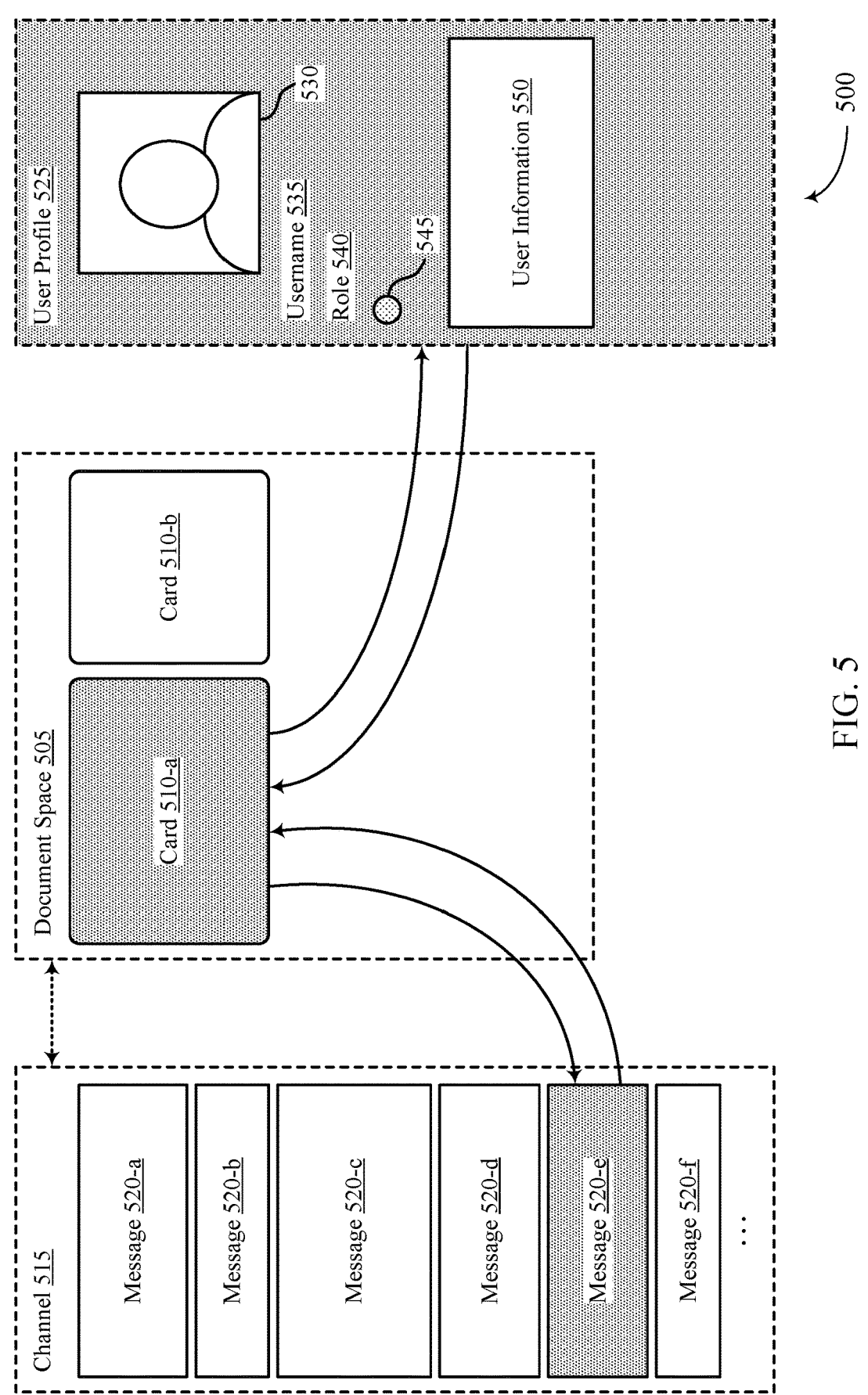
FIG. 5 illustrates an example of correlations within a group-based communication system that support automatic layout updates for document spaces in a group-based communication system in accordance with aspects of the present disclosure.

FIG. 5 illustrates an example of correlations 500 within a group-based communication system that support automatic layout updates for document spaces in a group-based communication system in accordance with aspects of the present disclosure. A group-based communication system may include a document space 505, which may include one or more cards arranged according to a layout. The document space 505, the cards, or both may be correlated with other aspects of the group-based communication system. These correlations 500 may support links, propagating updates, or both. As such, the document space 505 may improve a user experience within the group-based communication system by providing low-latency access to one or more other aspects of the group-based communication system from a single space (e.g., the document space 505).

For example, the document space 505 may include a first card 510-*a* and a second card 510-*b*. The first card 510-*a* may represent information within the group-based communication system. For example, the first card 510-*a* may represent a message 520-*e* posted to a channel 515. The first card 510-*a* may support links to the channel 515, the specific message 520-*e* within the channel 515, a user profile 525 of the user who posted the message 520-*e*, or any combination thereof. As such, from a single card 510-*a* displayed in the document space 505, a user may view a preview of multiple different aspects of the group-based communication system (e.g., a channel, a message, a user profile), may access multiple different aspects of the group-based communication system (e.g., using multiple links embedded within the card 510-*a*), or both.

In some cases, the document space 505 may be correlated with the channel 515. For example, the document space 505 may be a channel space for the channel 515. If a user selects to access the channel 515 (e.g., opening the channel 515 for viewing and interaction in a UI), the group-based communication system may automatically also access the document space 505 (e.g., opening the document space 505 for viewing and interaction in the UI). Similarly, if the user selects to access the document space 505, the group-based communication system may automatically access the related channel 515 (e.g., displaying both in the UI). Changing parameters or settings for the channel 515 may automatically change the same parameters or settings for the document space 505, such as access permissions, member users, display themes, pinned messages (e.g., pinning a message may automatically add the message to the document space 505 as a card), notification settings, a channel topic, a channel description, organizations, teams, or workspaces associated with (e.g., owning) the channel, integrations, channel files, or any other channel-specific parameters or settings.

The card 510-*a* may support multiple links. For example, a first link embedded in the card 510-*a* may link to the message 520-*e* represented by the card 510-*a*. Selecting the first link may cause the UI to display the channel 515 and navigate (e.g., scroll) to the message 520-*e* in a sequence of messages. For example, the channel 515 may include a message 520-*a*, a message 520-*b*, a message 520-*c*, a message 520-*d*, a message 520-*e*, and a message 520-*f* Selecting the first link may cause the UI to display the channel 515 such that the message 520-*e* is—partially or fully—visible in the UI. Additionally, the message 520-*e* may be correlated with the card 510-*a* in the document space 505, such that updates to the message 520-*e* may cause updates to the card 510-*a*. For example, if a user edits the message, a message preview in the card 510-*a* may automatically update to display the latest version of the message. Additionally, if a user replies to the message 520-*e* or reacts to the message 520-*e*, the group-based communication system may automatically update the card 510-*a* to indicate the reply or reaction (e.g., showing the reply or reaction in the message preview, or include a notification icon indicating that an update was made to the message 520-*e*). If the user views the update to the message 520-*e* (e.g., in the channel 515), the group-based communication system may automatically remove the notification icon from the card 510-*a* in the document space 505 for that user.

A second link embedded in the card 510-*a* may link to the user profile 525 corresponding to the user who posted the message 520-*e*. The user profile 525 may include a user profile picture 530, a username 535, a role 540, an activity indicator 545 (e.g., indicating whether the user is online, in a meeting, active, inactive, or any other activity indication), or any combination of these or other user information 550 (e.g., an email address, a mailing address, an organization and/or team). Selecting the second link may cause the UI to display the user profile 525. Additionally, the user profile 525 may be correlated with the card 510-*a* in the document space 505, such that updates to the user profile 525 may cause updates to the card 510-*a*. For example, if a user updates their user profile picture 530, a profile picture displayed in the card 510-*a* may automatically update to show the most up-to-date user profile picture 530 to any users viewing the document space 505.

Accordingly, the card 510-*a* may render visual information relating to different aspects (e.g., messages, channels, direct messages, user profiles) within the group-based communication system. Additionally, or alternatively, the card 510-*a* may support one-click access to multiple different resources within the group-based communication system, external to the group-based communication system, or both. For example, clicking on different pixels within the card 510-*a* may link to different resources. In some examples, clicking on a user profile picture within the card 510-*a* may link to the user profile 525, clicking on a timestamp or message preview within the card 510-*a* may link to the message 520-*e* in the channel 515, clicking on an external link within the message preview (e.g., if the message 520-*e* includes an external link) may link to the external resource referenced by the link, or any combination thereof. The document space 505 may provide a flexible layout for viewing, adding, editing, and arranging multiple cards that may provide previews for—and access to—multiple resources internal and external to the group-based communication system, effectively improving user experience and reducing the latency involved in viewing or accessing different resources.

Figure 6:
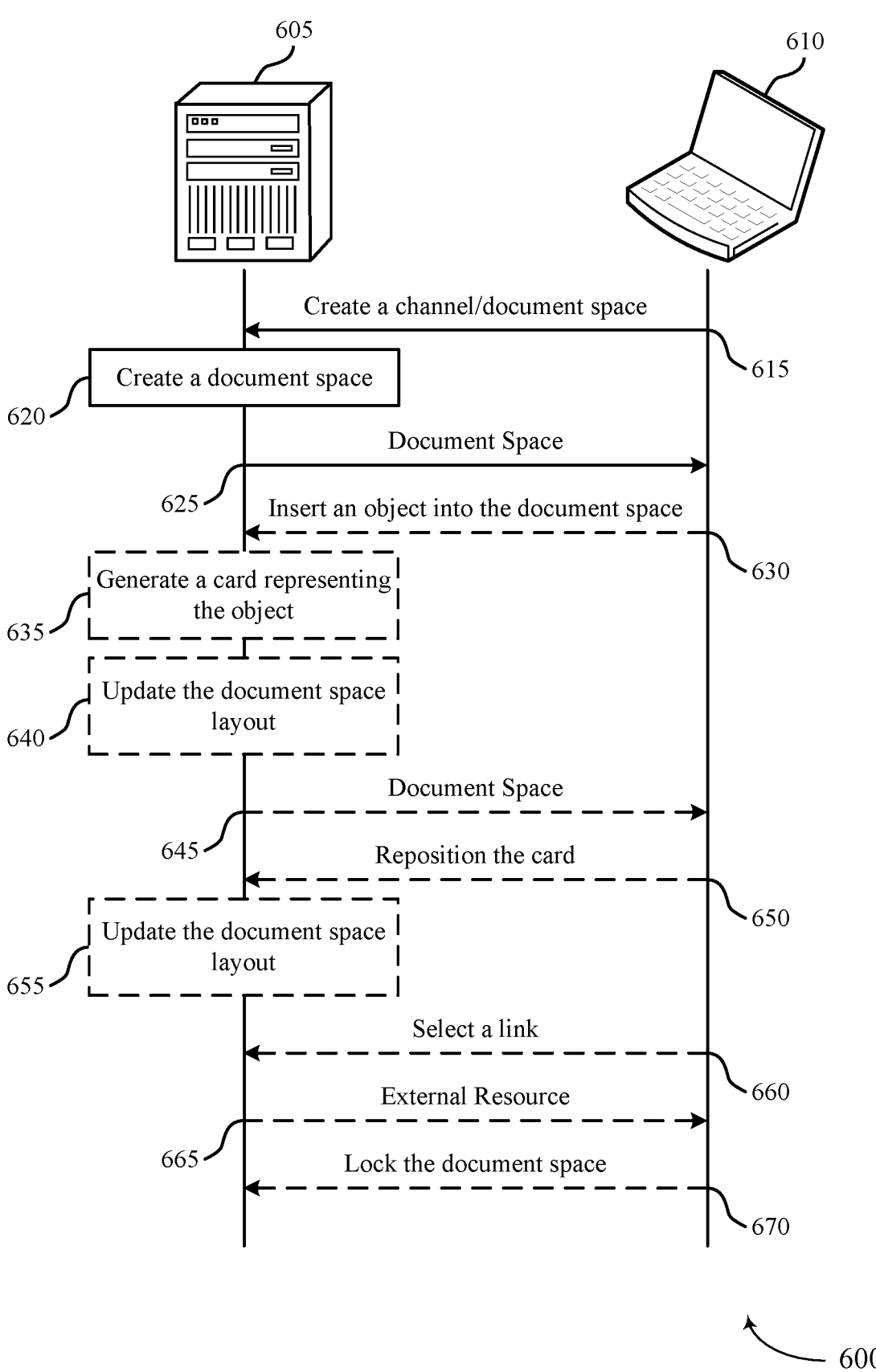
FIG. 6 illustrates an example of a process flow that supports automatic layout updates for document spaces in a group-based communication system in accordance with aspects of the present disclosure.

FIG. 6 illustrates an example of a process flow 600 that supports automatic layout updates for document spaces in a group-based communication system in accordance with aspects of the present disclosure. The process flow 600 may be implemented by a group-based communication system including one or more computing devices 605 and one or more user devices 610. The computing device 605 (e.g., a processing device or system) may host a group-based communication platform. The computing device 605 may be an example of an application server, a database server, a cloud-based server or service, a worker server, a server cluster, a virtual machine, a container, a network device, a user device, or any combination of these or other computing devices or systems. The user device 610 may access the group-based communication platform over a network, based on downloading an application, or both. The user device 610 may be an example of a laptop, desktop computer, mobile device, smartphone, smartwatch, tablet, virtual reality (VR) device, or any combination thereof. The user device 610 may include a UI (e.g., a GUI) that can present information (e.g., visually, audibly) corresponding to the group-based communication system, as described herein with reference to FIGS. 1 through 5. Alternative examples of the following may be implemented, where some processes are performed in a different order than described or are not performed at all. In some examples, processes may include additional features not mentioned below, or further processes may be added. Additionally, or alternatively, one or more operations described herein as performed by the computing device 605 may instead be performed by the user device 610, for example, if the user device 610 runs a group-based communication platform application locally.

The computing device 605, the user device 610, or both may run the group-based communication system platform. The user device 610 may display, via a UI, one or more visual panes for the group-based communication platform, as described herein with reference to FIGS. 2 and 3.

At 615, a user may trigger creation of a channel or a document space in the group-based communication system. For example, the user may provide an input to the user device 610 to create the channel or document space. At 620, the computing device 605 may create the document space in response to the input. The document space may correspond to the group-based communication system. For example, the group-based communication system may store code defining the document space. In some examples, the user may select to create a channel (e.g., a group-based communication channel) in the group-based communication system, and the computing device 605 may create the channel and the document space in response. In such examples, the document space may be an example of a channel space associated with the channel. In some other examples, the user may select to create a document (e.g., a freeform space) in the group-based communication system, and the computing device 605 may create a document including the document space in response. In such examples, the document space may be unassociated with any specific channel.

At 625, the computing device 605 may send the document space to the user device 610 for display via a UI of the user device 610. In some examples, if the document space is associated with a channel, the computing device 605 may send the document space for display in a sidebar of the UI and may send a sequence of messages associated with the channel for display in a main pane of the UI. In some other examples, if the document space is unassociated with a channel, the computing device 605 may send the document space for display in the main pane of the UI or for display in a pop-out pane of the UI.

At 630, a user may add an object to the document space. For example, the user may provide an input via the UI to insert the object into the document space. In some cases, the user may drag-and-drop the object into the document space. The computing device 605 may receive, from the user device 610, an input indicating insertion of the object into the document space.

At 635, the computing device 605 may generate a card representing the object. For example, the computing device 605 may generate the card in response to the input indicating insertion of the object into the document space. The card may be an example of a link unfurl card, and the card may function as a building block for dragging and dropping objects within a layout (e.g., a grid) of the document space. The card may include a preview image for the object and at least one link to a resource external to the document space (e.g., external to the group-based communication system or internal to the group-based communication system) that is associated with the object. In some examples, the computing device 605 may retrieve a subset of information associated with the resource external to the document space, and the preview image for the object may include at least a portion of the retrieved subset of information.

At 640, the computing device 605 may update the layout of the document space to include the generated card. For example, the computing device 605 may add an additional column, an additional row, or both to the layout, where the additional column, the additional row, or both includes the generated card. Additionally, or alternatively, the computing device 605 may rearrange one or more cards in the existing layout to fit the generated card into the layout of the document space. In some cases, the computing device 605 may automatically resize the card, one or more other cards currently in the layout of the document space, or both for display in the UI based on a width of the additional column, a height of the additional row, or both. For example, the computing device 605 may resize the cards and corresponding columns to span a full width of the document space. At 645, the computing device 605 may send, for display in the UI of the user device 610, the document space including the card based on the updated layout. The user device 610 may display the updated layout of the document space via the UI.

At 650, a user may reposition the card within the layout of the document space. For example, the user may drag-and-drop the card from a first position to a second position within the layout (e.g., the grid layout) of the document space using the UI of the user device 610. In some cases, the computing device 605 may send, for display in the UI of the user device 610, a thumbnail image associated with the object, a name associated with the object, or both. While the user is dragging the card, the user device 610 may display the thumbnail image, the name, or both proximate to the user's cursor to indicate which object is represented by the card being moved within the document space. The computing device 605 may receive, from the user device 610, an input indicating selection and repositioning of the card in the UI. At 655, the computing device 605 may further update the layout of the document space based on the repositioning of the card in the UI. For example, the computing device 605 may add a column, add a row, remove a column, remove a row, rearrange one or more other cards in the layout, or any combination thereof to reposition the card within the layout of the document space. The computing device 605 may send the further updated layout to the user device 610, such that the user device 610 may display the document space via the UI using the latest version of the layout (e.g., the further updated layout).

At 660, a user may select a link supported by the card. For example, the user device 610 may render information in the card, and some portions of the card may support link functionality. For example, selecting an icon rendered within the card may trigger the computing device 605 or the user device 610 to open a webpage represented by the icon and indicated by a link embedded in the icon. As such, the user may click a portion of the card to trigger selection of the link. The computing device 605 may receive an input indicating selection of the link. At 665, and in response to the input indicating selection of the link, the computing device 605 may send the resource external to the document space that is indicated by the link to the user device 610 for display via the UI. In some examples, the card may represent a message associated with a channel of the group-based communication system (e.g., a message posted to a group-based communication channel). In some such examples, the computing device 605 may send, for display in the UI of the user device 610, a sequence of messages associated with the channel and may navigate to the message (e.g., the specific message represented by the card) in the sequence of messages associated with the channel based on the selection of the link. The link may indicate a channel ID associated with the channel and a post sequence number associated with a positioning of the message within the sequence of messages. Navigating to the specific message within the sequence of messages may be based on the channel ID, the post sequence number, or both. In some examples, a card may support multiple different links. For example, the card may support a first link to the message in the channel, a second link to the channel (e.g., the channel in general), a third link to a user profile corresponding to an author of the message, a fourth link to a webpage (e.g., where the link to the webpage is included in the message's text), or any combination thereof. Additionally, or alternatively, updating the message in the channel may correspondingly update the preview of the message in the card. For example, the computing device 605 may detect an update to the message in the channel and may automatically update the preview image for the object in response to the update to the message.

At 670, a user may lock changes to the layout of the document space. For example, the user (e.g., a user with locking permissions for the document space) may select an affordance displayed in the UI of the user device 610 to trigger locking the design of the document space. The computing device 605 may receive an input locking changes to the document space. If, after locking changes to the document space, a user selects a card in the UI, the computing device 605, the user device 610, or both may refrain from repositioning the card in the UI in response to the user's selection (e.g., based on locking the changes to the document space). In some cases, the user device 610 may refrain from displaying a drag-and-drop affordance on the cards in response to locking the changes. In some other cases, the user device 610 may deactivate the functionality of the drag-and-drop affordances on the cards.

Figure 7:
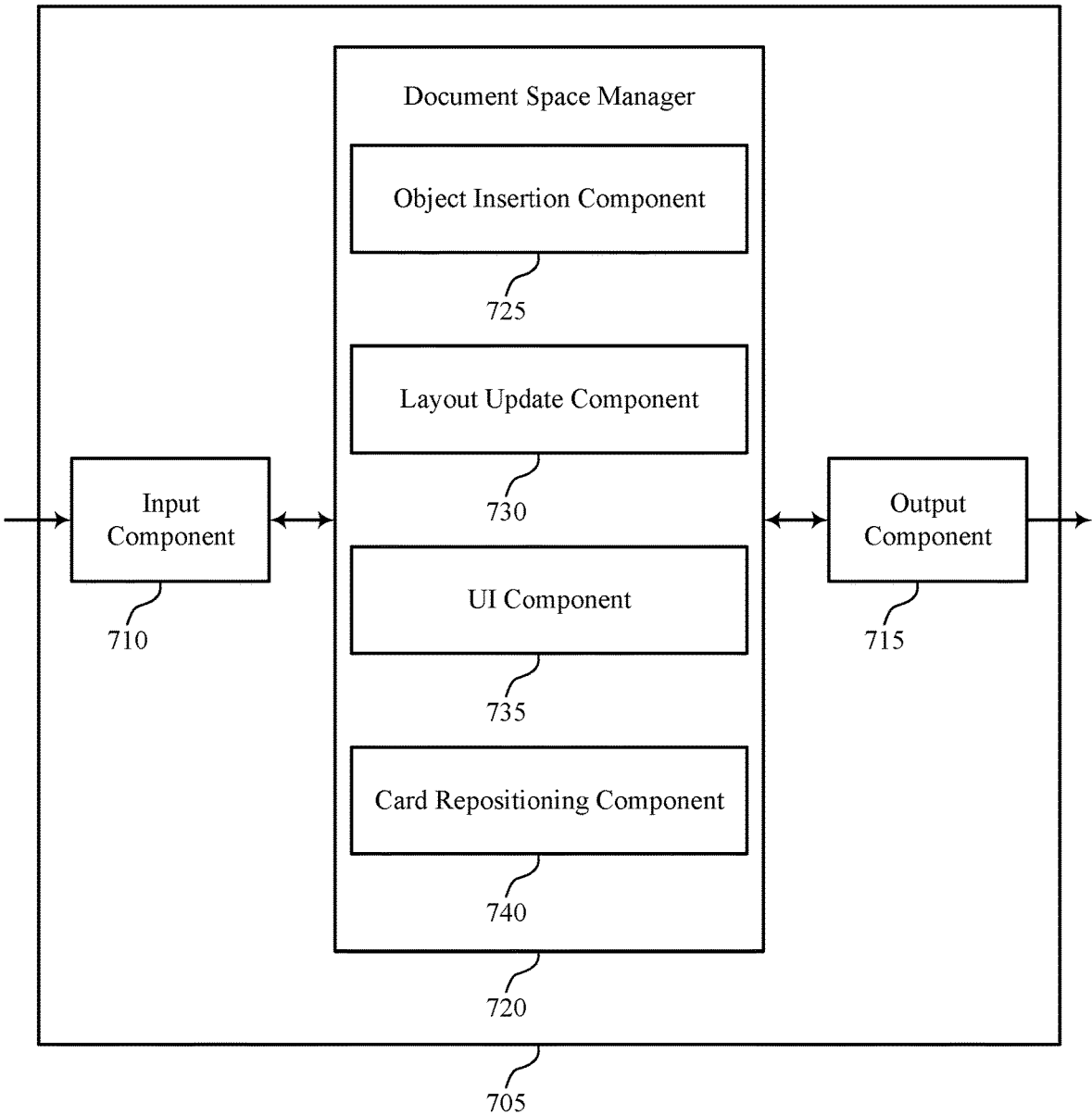
FIG. 7 illustrates a block diagram of an apparatus that supports automatic layout updates for document spaces in a group-based communication system in accordance with aspects of the present disclosure.

FIG. 7 illustrates a block diagram 700 of a device 705 that supports automatic layout updates for document spaces in a group-based communication system in accordance with aspects of the present disclosure. The device 705 may be an example of a processing device or system, such as an application server, a database server, a cloud-based server or service, a worker server, a server cluster, a virtual machine, a container, a network device, a user device, or any combination of these or other computing devices or systems. The device 705 may include an input component 710, an output component 715, and a document space manager 720. The device 705 may also include a processor. Each of these components may be in communication with one another (e.g., via one or more buses).

The input component 710 may manage input signals for the device 705. For example, the input component 710 may identify input signals based on an interaction with a modem, a keyboard, a mouse, a touchscreen, or a similar device. These input signals may be associated with user input or processing at other components or devices. In some cases, the input component 710 may utilize an operating system such as iOS®, ANDROID®, MS-DOS®, MS-WINDOWS®, OS/2®, UNIX®, LINUX®, or another known operating system to handle input signals. The input component 710 may send aspects of these input signals to other components of the device 705 for processing. For example, the input component 710 may transmit input signals to the document space manager 720 to support automatic layout updates for document spaces in a group-based communication system. In some cases, the input component 710 may be a component of an input/output (I/O) controller 910 as described with reference to FIG. 9.

The output component 715 may manage output signals for the device 705. For example, the output component 715 may receive signals from other components of the device 705, such as the document space manager 720, and may transmit these signals to other components or devices. In some examples, the output component 715 may transmit output signals for display in a UI, for storage in a database or data store, for further processing at a server or server cluster, or for any other processes at any number of devices or systems. In some cases, the output component 715 may be a component of an I/O controller 910 as described with reference to FIG. 9.

For example, the document space manager 720 may include an object insertion component 725, a layout update component 730, a UI component 735, a card repositioning component 740, or any combination thereof. In some examples, the document space manager 720, or various components thereof, may be configured to perform various operations (e.g., receiving, monitoring, transmitting) using or otherwise in cooperation with the input component 710, the output component 715, or both. For example, the document space manager 720 may receive information from the input component 710, send information to the output component 715, or be integrated in combination with the input component 710, the output component 715, or both to receive information, transmit information, or perform various other operations as described herein.

The document space manager 720 may support document space configuration in accordance with examples as disclosed herein. The object insertion component 725 may be configured as or otherwise support a means for receiving a first input indicating insertion of an object into a document space, the document space corresponding to a group-based communication system. The object insertion component 725 may be configured as or otherwise support a means for, in response to the first input, generating a card representing the object, the card including a preview image for the object and at least one link to a resource external to the document space that is associated with the object. The layout update component 730 may be configured as or otherwise support a means for updating a layout of the document space to include an additional column, an additional row, or both, where the additional column, the additional row, or both includes the card. The UI component 735 may be configured as or otherwise support a means for sending, for display in a UI of a user device, the document space including the card based on the updated layout. The card repositioning component 740 may be configured as or otherwise support a means for receiving a second input indicating selection and repositioning of the card in the UI. The layout update component 730 may be configured as or otherwise support a means for, in response to the second input, further updating the layout of the document space based on the repositioning of the card in the UI.

Figure 8:
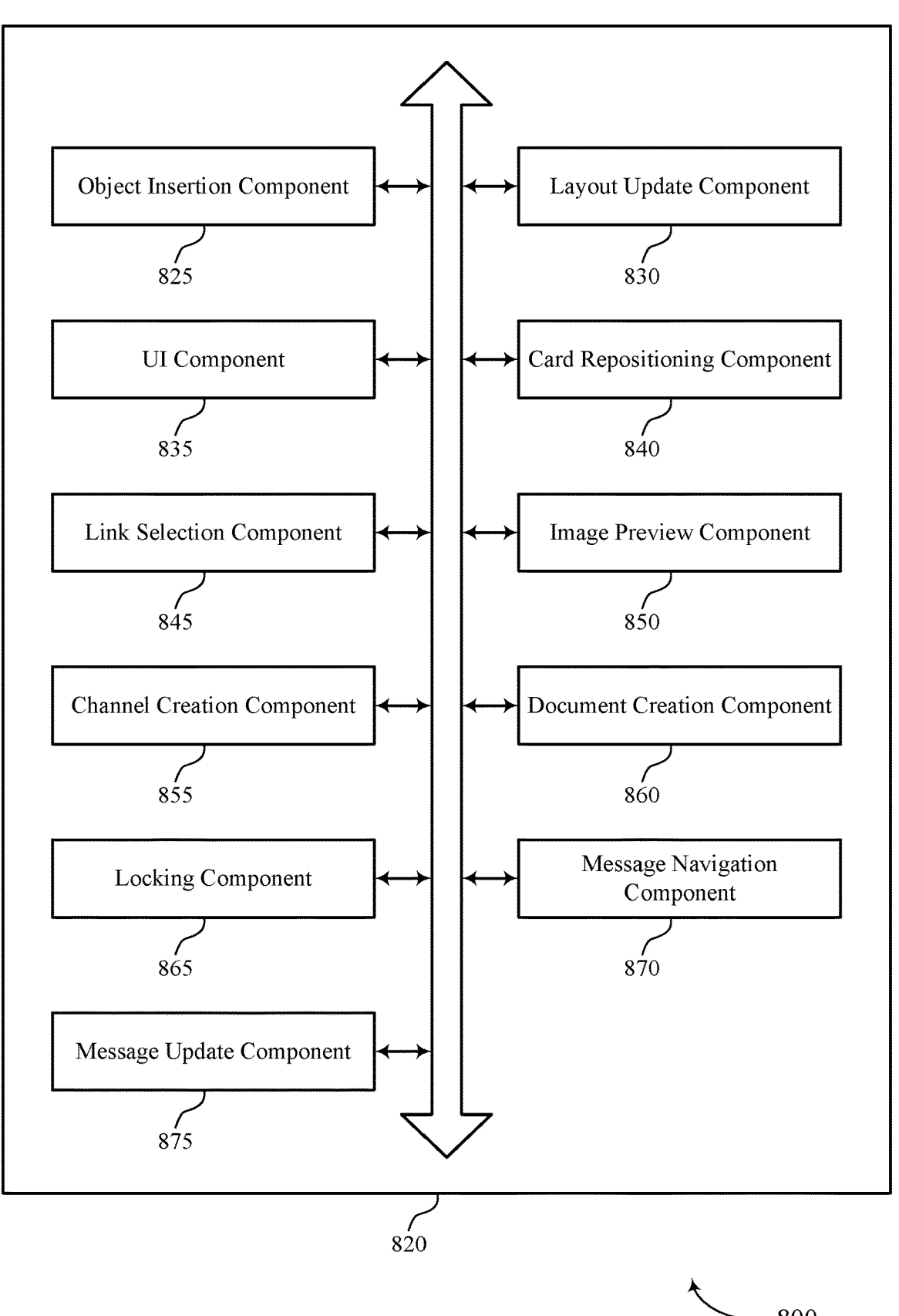
FIG. 8 illustrates a block diagram of a document space manager that supports automatic layout updates for document spaces in a group-based communication system in accordance with aspects of the present disclosure.

FIG. 8 illustrates a block diagram 800 of a document space manager 820 that supports automatic layout updates for document spaces in a group-based communication system in accordance with aspects of the present disclosure. The document space manager 820 may be an example of aspects of a document space manager 720 as described herein. The document space manager 820, or various components thereof, may be an example of means for performing various aspects of automatic layout updates for document spaces in a group-based communication system as described herein. For example, the document space manager 820 may include an object insertion component 825, a layout update component 830, a UI component 835, a card repositioning component 840, a link selection component 845, an image preview component 850, a channel creation component 855, a document creation component 860, a locking component 865, a message navigation component 870, a message update component 875, or any combination thereof. Each of these components may communicate, directly or indirectly, with one another (e.g., via one or more buses).

The document space manager 820 may support document space configuration in accordance with examples as disclosed herein. The object insertion component 825 may be configured as or otherwise support a means for receiving a first input indicating insertion of an object into a document space, the document space corresponding to a group-based communication system. In some examples, the object insertion component 825 may be configured as or otherwise support a means for, in response to the first input, generating a card representing the object, the card including a preview image for the object and at least one link to a resource external to the document space that is associated with the object. The layout update component 830 may be configured as or otherwise support a means for updating a layout of the document space to include an additional column, an additional row, or both, where the additional column, the additional row, or both includes the card. The UI component 835 may be configured as or otherwise support a means for sending, for display in a UI of a user device, the document space including the card based on the updated layout. The card repositioning component 840 may be configured as or otherwise support a means for receiving a second input indicating selection and repositioning of the card in the UI. In some examples, the layout update component 830 may be configured as or otherwise support a means for, in response to the second input, further updating the layout of the document space based on the repositioning of the card in the UI.

In some examples, the link selection component 845 may be configured as or otherwise support a means for receiving a third input indicating selection of the at least one link. In some examples, the link selection component 845 may be configured as or otherwise support a means for, in response to the third input, sending, for display in the UI, the resource external to the document space.

In some examples, the object may be a message associated with a channel of the group-based communication system. In some examples, to support sending, for display in the UI, the resource external to the document space, the message navigation component 870 may be configured as or otherwise support a means for sending, for display in the UI, a sequence of messages associated with the channel. In some examples, the message navigation component 870 may be configured as or otherwise support a means for navigating to the message in the sequence of messages associated with the channel based on the at least one link.

In some examples, the message update component 875 may be configured as or otherwise support a means for detecting an update to the message in the channel. In some examples, the message update component 875 may be configured as or otherwise support a means for, in response to the update to the message, updating the preview image for the object.

In some examples, the at least one link indicates a channel ID associated with the channel and a post sequence number associated with a positioning of the message within the sequence of messages. In some examples, the navigating to the message is based on the channel ID and the post sequence number. In some examples, the card supports a first link to the message in the channel, a second link to the channel, a third link to a user profile corresponding to an author of the message, a fourth link to a webpage, or any combination thereof. In some examples, the fourth link to the webpage is included in text of the message.

In some examples, the image preview component 850 may be configured as or otherwise support a means for retrieving a subset of information associated with the resource external to the document space, where the preview image for the object is based on the retrieved subset of information.

In some examples, the channel creation component 855 may be configured as or otherwise support a means for receiving a request to create a channel in the group-based communication system. In some examples, the channel creation component 855 may be configured as or otherwise support a means for, in response to the request, creating the channel and the document space, where the document space is associated with the channel. In some examples, to support sending, for display in the UI of the user device, the document space, the UI component 835 may be configured as or otherwise support a means for sending a sequence of messages associated with the channel for display in a main pane of the UI and sending the document space for display in a sidebar of the UI based on the document space being associated with the channel.

In some other examples, the document creation component 860 may be configured as or otherwise support a means for receiving a request to create a document in the group-based communication system. In some examples, the document creation component 860 may be configured as or otherwise support a means for, in response to the request, creating the document space, where the document includes the document space.

In some examples, to support updating the layout of the document space, the layout update component 830 may be configured as or otherwise support a means for automatically resizing the card for display in the UI based on a width of the additional column, a height of the additional row, or both. In some examples, the card repositioning component 840 may be configured as or otherwise support a means for, further in response to the second input, sending, for display in the UI, a thumbnail image associated with the object.

In some examples, the locking component 865 may be configured as or otherwise support a means for receiving a fourth input locking changes to the document space. In some examples, the card repositioning component 840 may be configured as or otherwise support a means for receiving a fifth input indicating selection of the card in the UI. In some examples, the locking component 865 may be configured as or otherwise support a means for refraining from repositioning the card in the UI in response to the fifth input based on the fourth input locking the changes to the document space.

In some examples, the document space includes a first iframe and the card includes a second iframe different from the first iframe. In some examples, the first input includes dragging and dropping the object into the document space or selecting an affordance triggering the insertion of the object into the document space. In some examples, the second input includes dragging and dropping the card from a first position in the layout of the document space to a second position in the layout of the document space.

In some examples, the layout of the document space includes one or more messages associated with one or more channels of the group-based communication system, one or more images, one or more files, one or more application links, one or more webpage links, one or more text blocks, or any combination thereof. In some examples, the layout of the document space includes a first quantity of columns and a second quantity of rows based on a threshold quantity of columns, a threshold column width, a threshold row height, or any combination thereof. In some examples, the document space includes one or more layouts, the one or more layouts including at least the layout.

Figure 9:
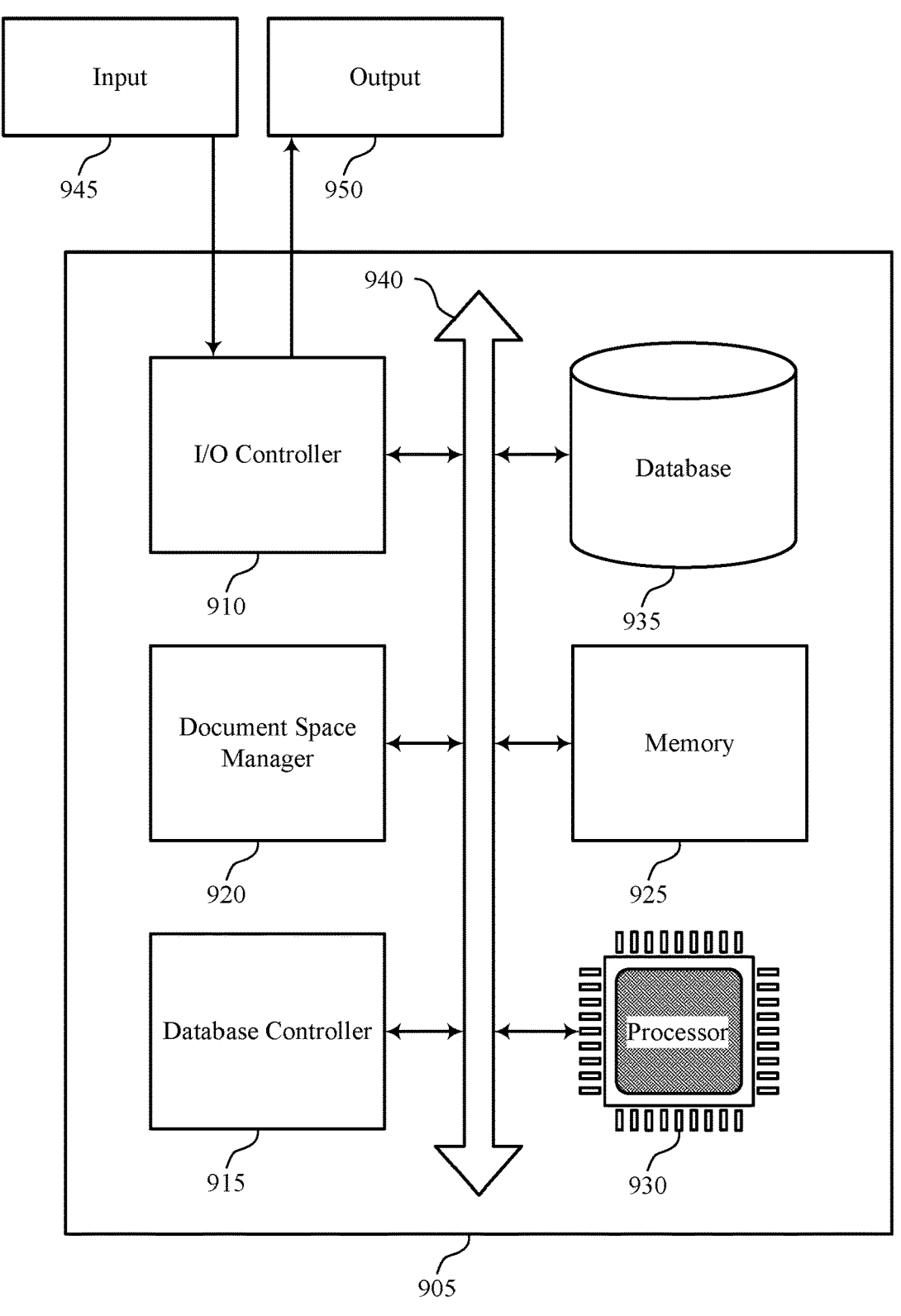
FIG. 9 illustrates a diagram of a system including a device that supports automatic layout updates for document spaces in a group-based communication system in accordance with aspects of the present disclosure.

FIG. 9 illustrates a diagram of a system 900 including a device 905 that supports automatic layout updates for document spaces in a group-based communication system in accordance with aspects of the present disclosure. The device 905 may be an example of or include the components of a device 705 as described herein. The device 905 may include components for bi-directional data communications including components for transmitting and receiving communications, such as a document space manager 920, an I/O controller 910, a database controller 915, a memory 925, a processor 930, and a database 935. These components may be in electronic communication or otherwise coupled (e.g., operatively, communicatively, functionally, electronically, electrically) via one or more buses (e.g., a bus 940).

The I/O controller 910 may manage input signals 945 and output signals 950 for the device 905. The I/O controller 910 may also manage peripherals not integrated into the device 905. In some cases, the I/O controller 910 may represent a physical connection or port to an external peripheral. In some cases, the I/O controller 910 may utilize an operating system such as iOS®, ANDROID®, MS-DOS®, MS-WINDOWS®, OS/2®, UNIX®, LINUX®, or another known operating system. In some other cases, the I/O controller 910 may represent or interact with a modem, a keyboard, a mouse, a touchscreen, or a similar device. In some cases, the I/O controller 910 may be implemented as part of a processor 930. In some examples, a user may interact with the device 905 via the I/O controller 910 or via hardware components controlled by the I/O controller 910.

The database controller 915 may manage data storage and processing in a database 935. In some cases, a user may interact with the database controller 915. In other cases, the database controller 915 may operate automatically without user interaction. The database 935 may be an example of a single database, a distributed database, multiple distributed databases, a data store, a data lake, or an emergency backup database.

Memory 925 may include random-access memory (RAM) and read-only memory (ROM). The memory 925 may store computer-readable, computer-executable software including instructions that, when executed, cause the processor 930 to perform various functions described herein. In some cases, the memory 925 may contain, among other things, a basic I/O system (BIOS) which may control basic hardware or software operation such as the interaction with peripheral components or devices.

The processor 930 may include an intelligent hardware device (e.g., a general-purpose processor, a digital signal processor (DSP), a central processing unit (CPU), a microcontroller, an application-specific integration circuit (ASIC), a field-programmable gate array (FPGA), a programmable logic device, a discrete gate or transistor logic component, a discrete hardware component, or any combination thereof). In some cases, the processor 930 may be configured to operate a memory array using a memory controller. In other cases, a memory controller may be integrated into the processor 930. The processor 930 may be configured to execute computer-readable instructions stored in a memory 925 to perform various functions (e.g., functions or tasks supporting automatic layout updates for document spaces in a group-based communication system).

The document space manager 920 may support document space configuration in accordance with examples as disclosed herein. For example, the document space manager 920 may be configured as or otherwise support a means for receiving a first input indicating insertion of an object into a document space, the document space corresponding to a group-based communication system. The document space manager 920 may be configured as or otherwise support a means for, in response to the first input, generating a card representing the object, the card including a preview image for the object and at least one link to a resource external to the document space that is associated with the object. The document space manager 920 may be configured as or otherwise support a means for updating a layout of the document space to include an additional column, an additional row, or both, where the additional column, the additional row, or both includes the card. The document space manager 920 may be configured as or otherwise support a means for sending, for display in a UI of a user device, the document space including the card based on the updated layout. The document space manager 920 may be configured as or otherwise support a means for receiving a second input indicating selection and repositioning of the card in the UI. The document space manager 920 may be configured as or otherwise support a means for, in response to the second input, further updating the layout of the document space based on the repositioning of the card in the UI.

FIG. 10 illustrates a flowchart showing a method 1000 that supports automatic layout updates for document spaces in a group-based communication system in accordance with aspects of the present disclosure. The operations of the method 1000 may be implemented by a group-based communication system or its components (e.g., a processing device, such as an application server, a database server, a cloud-based server or service, a worker server, a server cluster, a virtual machine, a container, a network device, a user device, or any combination of these or other computing devices) as described herein. For example, the operations of the method 1000 may be performed by a group-based communication system as described with reference to FIGS. 1 through 9. In some examples, the group-based communication system may execute a set of instructions to control the functional elements of the group-based communication system to perform the described functions. Additionally, or alternatively, the group-based communication system may perform aspects of the described functions using special-purpose hardware.

At 1005, the method may include receiving a first input indicating insertion of an object into a document space. In some examples, the document space corresponds to a group-based communication system. The operations of 1005 may be performed in accordance with examples as disclosed herein. In some examples, aspects of the operations of 1005 may be performed by an object insertion component 825 as described with reference to FIG. 8.

At 1010, the method may include generating a card representing the object in response to the first input. The card may include a preview image for the object and at least one link to a resource external to the document space that is associated with the object. The operations of 1010 may be performed in accordance with examples as disclosed herein. In some examples, aspects of the operations of 1010 may be performed by an object insertion component 825 as described with reference to FIG. 8.

At 1015, the method may include updating a layout of the document space to include an additional column, an additional row, or both, where the additional column, the additional row, or both includes the card. The operations of 1015 may be performed in accordance with examples as disclosed herein. In some examples, aspects of the operations of 1015 may be performed by a layout update component 830 as described with reference to FIG. 8.

At 1020, the method may include sending, for display in a UI of a user device, the document space including the card based on the updated layout. The operations of 1020 may be performed in accordance with examples as disclosed herein. In some examples, aspects of the operations of 1020 may be performed by a UI component 835 as described with reference to FIG. 8.

At 1025, the method may include receiving a second input indicating selection and repositioning of the card in the UI. The operations of 1025 may be performed in accordance with examples as disclosed herein. In some examples, aspects of the operations of 1025 may be performed by a card repositioning component 840 as described with reference to FIG. 8.

At 1030, the method may include, in response to the second input, further updating the layout of the document space based on the repositioning of the card in the UI. The operations of 1030 may be performed in accordance with examples as disclosed herein. In some examples, aspects of the operations of 1030 may be performed by a layout update component 830 as described with reference to FIG. 8.

FIG. 11 illustrates a flowchart showing a method 1100 that supports automatic layout updates for document spaces in a group-based communication system in accordance with aspects of the present disclosure. The operations of the method 1100 may be implemented by a group-based communication system or its components (e.g., a processing device, such as an application server, a database server, a cloud-based server or service, a worker server, a server cluster, a virtual machine, a container, a network device, a user device, or any combination of these or other computing devices) as described herein. For example, the operations of the method 1100 may be performed by a group-based communication system as described with reference to FIGS. 1 through 9. In some examples, the group-based communication system may execute a set of instructions to control the functional elements of the group-based communication system to perform the described functions. Additionally, or alternatively, the group-based communication system may perform aspects of the described functions using special-purpose hardware.

At 1105, the method may include receiving a first input indicating insertion of an object into a document space, the document space corresponding to a group-based communication system. The operations of 1105 may be performed in accordance with examples as disclosed herein. In some examples, aspects of the operations of 1105 may be performed by an object insertion component 825 as described with reference to FIG. 8.

At 1110, the method may include, in response to the first input, generating a card representing the object, the card includes a preview image for the object and at least one link to a resource external to the document space that is associated with the object. The operations of 1110 may be performed in accordance with examples as disclosed herein. In some examples, aspects of the operations of 1110 may be performed by an object insertion component 825 as described with reference to FIG. 8.

At 1115, the method may include updating a layout of the document space to include an additional column, an additional row, or both, where the additional column, the additional row, or both includes the card. The operations of 1115 may be performed in accordance with examples as disclosed herein. In some examples, aspects of the operations of 1115 may be performed by a layout update component 830 as described with reference to FIG. 8.

At 1120, the method may include sending, for display in a UI of a user device, the document space including the card based on the updated layout. The operations of 1120 may be performed in accordance with examples as disclosed herein. In some examples, aspects of the operations of 1120 may be performed by a UI component 835 as described with reference to FIG. 8.

In some examples, at 1125, the method may include receiving an input indicating selection of the at least one link. The operations of 1125 may be performed in accordance with examples as disclosed herein. In some examples, aspects of the operations of 1125 may be performed by a link selection component 845 as described with reference to FIG. 8.

At 1130, the method may include sending, for display in the UI, the resource external to the document space in response to the input indicating selection of the at least one link. The operations of 1130 may be performed in accordance with examples as disclosed herein. In some examples, aspects of the operations of 1130 may be performed by a link selection component 845 as described with reference to FIG. 8.

At 1135, the method may include sending, for display in the UI, a sequence of messages associated with the channel. The operations of 1135 may be performed in accordance with examples as disclosed herein. In some examples, aspects of the operations of 1135 may be performed by a message navigation component 870 as described with reference to FIG. 8.

At 1140, the method may include navigating to the message in the sequence of messages associated with the channel based on the at least one link. The operations of 1140 may be performed in accordance with examples as disclosed herein. In some examples, aspects of the operations of 1140 may be performed by a message navigation component 870 as described with reference to FIG. 8.

Figure 12:
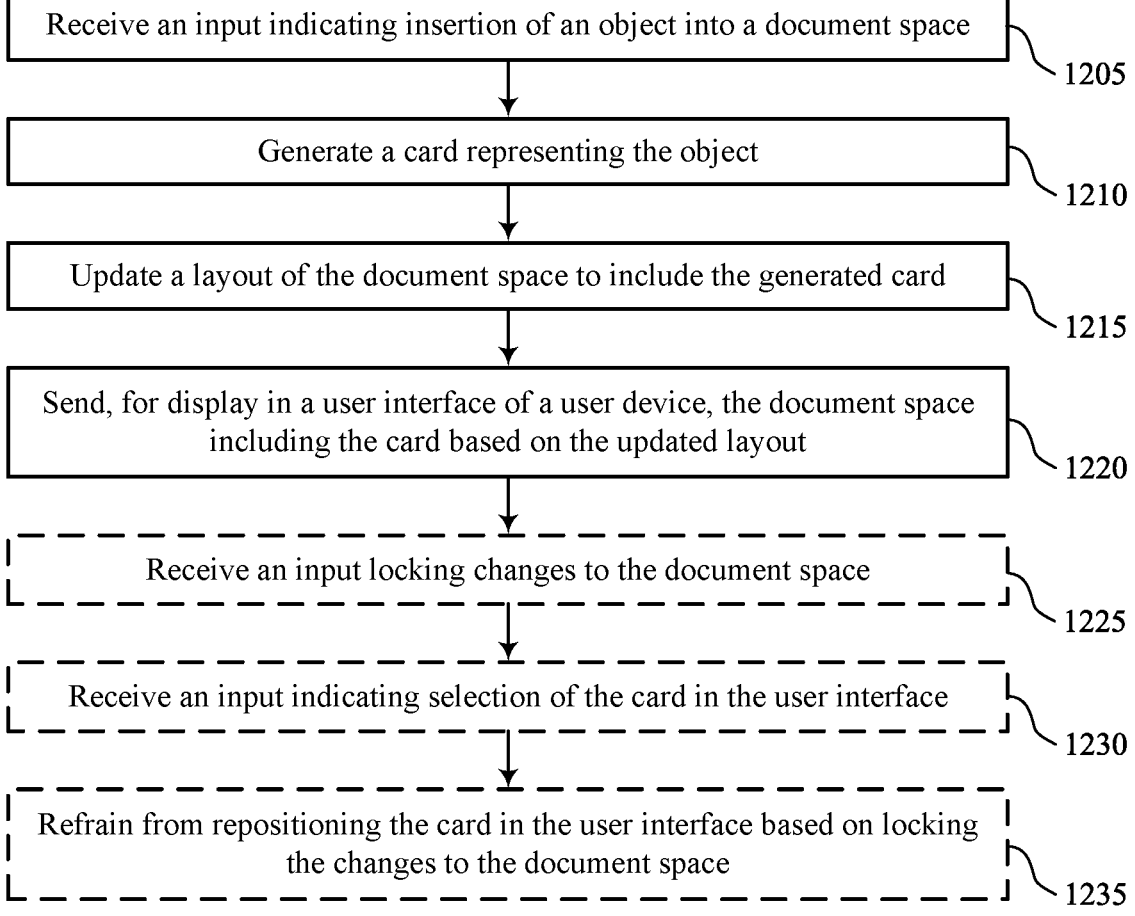

FIG. 12 illustrates a flowchart showing a method 1200 that supports automatic layout updates for document spaces in a group-based communication system in accordance with aspects of the present disclosure. The operations of the method 1200 may be implemented by a group-based communication system or its components (e.g., a processing device, such as an application server, a database server, a cloud-based server or service, a worker server, a server cluster, a virtual machine, a container, a network device, a user device, or any combination of these or other computing devices) as described herein. For example, the operations of the method 1200 may be performed by a group-based communication system as described with reference to FIGS. 1 through 9. In some examples, the group-based communication system may execute a set of instructions to control the functional elements of the group-based communication system to perform the described functions. Additionally, or alternatively, the group-based communication system may perform aspects of the described functions using special-purpose hardware.

At 1205, the method may include receiving a first input indicating insertion of an object into a document space, the document space corresponding to a group-based communication system. The operations of 1205 may be performed in accordance with examples as disclosed herein. In some examples, aspects of the operations of 1205 may be performed by an object insertion component 825 as described with reference to FIG. 8.

At 1210, the method may include, in response to the first input, generating a card representing the object, the card includes a preview image for the object and at least one link to a resource external to the document space that is associated with the object. The operations of 1210 may be performed in accordance with examples as disclosed herein. In some examples, aspects of the operations of 1210 may be performed by an object insertion component 825 as described with reference to FIG. 8.

At 1215, the method may include updating a layout of the document space to include an additional column, an additional row, or both, where the additional column, the additional row, or both includes the card. The operations of 1215 may be performed in accordance with examples as disclosed herein. In some examples, aspects of the operations of 1215 may be performed by a layout update component 830 as described with reference to FIG. 8.

At 1220, the method may include sending, for display in a UI of a user device, the document space including the card based on the updated layout. The operations of 1220 may be performed in accordance with examples as disclosed herein. In some examples, aspects of the operations of 1220 may be performed by a UI component 835 as described with reference to FIG. 8.

In some examples, at 1225, the method may include receiving an input locking changes to the document space. The operations of 1225 may be performed in accordance with examples as disclosed herein. In some examples, aspects of the operations of 1225 may be performed by a locking component 865 as described with reference to FIG. 8.

At 1230, the method may include receiving an input indicating selection of the card in the UI. The operations of 1230 may be performed in accordance with examples as disclosed herein. In some examples, aspects of the operations of 1230 may be performed by a card repositioning component 840 as described with reference to FIG. 8.

At 1235, the method may include refraining from repositioning the card in the UI in response to the input based on the input locking the changes to the document space. The operations of 1235 may be performed in accordance with examples as disclosed herein. In some examples, aspects of the operations of 1235 may be performed by a locking component 865 as described with reference to FIG. 8.

A method for document space configuration is described. The method may include receiving a first input indicating insertion of an object into a document space, the document space corresponding to a group-based communication system. The method may further include, in response to the first input, generating a card representing the object, the card including a preview image for the object and at least one link to a resource external to the document space that is associated with the object, and updating a layout of the document space to include an additional column, an additional row, or both, where the additional column, the additional row, or both includes the card. The method may further include sending, for display in a UI of a user device, the document space including the card based on the updated layout, receiving a second input indicating selection and repositioning of the card in the UI, and—in response to the second input—further updating the layout of the document space based on the repositioning of the card in the UI.

An apparatus for document space configuration is described. The apparatus may include a processor, memory coupled with the processor, and instructions stored in the memory. The instructions may be executable by the processor to cause the apparatus to receive a first input indicating insertion of an object into a document space, the document space corresponding to a group-based communication system. The instructions may be further executable by the processor to cause the apparatus to, in response to the first input, generate a card representing the object, the card including a preview image for the object and at least one link to a resource external to the document space that is associated with the object, and update a layout of the document space to include an additional column, an additional row, or both, where the additional column, the additional row, or both includes the card. The instructions may be further executable by the processor to cause the apparatus to send, for display in a UI of a user device, the document space including the card based on the updated layout, receive a second input indicating selection and repositioning of the card in the UI, and—in response to the second input—further update the layout of the document space based on the repositioning of the card in the UI.

Another apparatus for document space configuration is described. The apparatus may include means for receiving a first input indicating insertion of an object into a document space, the document space corresponding to a group-based communication system. The apparatus may further include means for, in response to the first input, generating a card representing the object, the card including a preview image for the object and at least one link to a resource external to the document space that is associated with the object, and means for updating a layout of the document space to include an additional column, an additional row, or both, where the additional column, the additional row, or both includes the card. The apparatus may further include means for sending, for display in a UI of a user device, the document space including the card based on the updated layout, means for receiving a second input indicating selection and repositioning of the card in the UI, and means for, in response to the second input, further updating the layout of the document space based on the repositioning of the card in the UI.

A non-transitory computer-readable medium storing code for document space configuration is described. The code may include instructions executable by a processor to receive a first input indicating insertion of an object into a document space, the document space corresponding to a group-based communication system. The code may further include instructions executable by the processor to, in response to the first input, generate a card representing the object, the card including a preview image for the object and at least one link to a resource external to the document space that is associated with the object, and update a layout of the document space to include an additional column, an additional row, or both, where the additional column, the additional row, or both includes the card. The code may further include instructions executable by the processor to send, for display in a UI of a user device, the document space including the card based on the updated layout, receive a second input indicating selection and repositioning of the card in the UI, and—in response to the second input—further update the layout of the document space based on the repositioning of the card in the UI.

Some examples of the method, apparatuses, and non-transitory computer-readable medium described herein may further include operations, features, means, or instructions for receiving a third input indicating selection of the at least one link and, in response to the third input, sending, for display in the UI, the resource external to the document space.

In some examples of the method, apparatuses, and non-transitory computer-readable medium described herein, the object may include a message associated with a channel of the group-based communication system. In some examples of the method, apparatuses, and non-transitory computer-readable medium described herein, sending, for display in the UI, the resource external to the document space may include operations, features, means, or instructions for sending, for display in the UI, a sequence of messages associated with the channel and navigating to the message in the sequence of messages associated with the channel based on the at least one link. Some examples of the method, apparatuses, and non-transitory computer-readable medium described herein may further include operations, features, means, or instructions for detecting an update to the message in the channel and, in response to the update to the message, updating the preview image for the object.

In some examples of the method, apparatuses, and non-transitory computer-readable medium described herein, the at least one link indicates a channel ID associated with the channel and a post sequence number associated with a positioning of the message within the sequence of messages. In some examples of the method, apparatuses, and non-transitory computer-readable medium described herein, the navigating to the message may be based on the channel ID and the post sequence number. In some examples of the method, apparatuses, and non-transitory computer-readable medium described herein, the card supports a first link to the message in the channel, a second link to the channel, a third link to a user profile corresponding to an author of the message, a fourth link to a webpage, or any combination thereof, where the fourth link to the webpage may be included in text of the message.

Some examples of the method, apparatuses, and non-transitory computer-readable medium described herein may further include operations, features, means, or instructions for retrieving a subset of information associated with the resource external to the document space, where the preview image for the object may be based on the retrieved subset of information.

Some examples of the method, apparatuses, and non-transitory computer-readable medium described herein may further include operations, features, means, or instructions for receiving a request to create a channel in the group-based communication system and—in response to the request—creating the channel and the document space, where the document space may be associated with the channel. In some examples of the method, apparatuses, and non-transitory computer-readable medium described herein, sending, for display in the UI of the user device, the document space may include operations, features, means, or instructions for sending a sequence of messages associated with the channel for display in a main pane of the UI and sending the document space for display in a sidebar of the UI based on the document space being associated with the channel.

Some examples of the method, apparatuses, and non-transitory computer-readable medium described herein may further include operations, features, means, or instructions for receiving a request to create a document in the group-based communication system and—in response to the request—creating the document space, where the document includes the document space.

In some examples of the method, apparatuses, and non-transitory computer-readable medium described herein, updating the layout of the document space may include operations, features, means, or instructions for automatically resizing the card for display in the UI based on a width of the additional column, a height of the additional row, or both. Some examples of the method, apparatuses, and non-transitory computer-readable medium described herein may further include operations, features, means, or instructions for, further in response to the second input, sending, for display in the UI, a thumbnail image associated with the object.

Some examples of the method, apparatuses, and non-transitory computer-readable medium described herein may further include operations, features, means, or instructions for receiving a fourth input locking changes to the document space, receiving a fifth input indicating selection of the card in the UI, and refraining from repositioning the card in the UI in response to the fifth input based on the fourth input locking the changes to the document space.

In some examples of the method, apparatuses, and non-transitory computer-readable medium described herein, the document space includes a first iframe, and the card includes a second iframe different from the first iframe. In some examples of the method, apparatuses, and non-transitory computer-readable medium described herein, the first input includes dragging and dropping the object into the document space or selecting an affordance triggering the insertion of the object into the document space. In some examples of the method, apparatuses, and non-transitory computer-readable medium described herein, the second input includes dragging and dropping the card from a first position in the layout of the document space to a second position in the layout of the document space.

In some examples of the method, apparatuses, and non-transitory computer-readable medium described herein, the layout of the document space includes one or more messages associated with one or more channels of the group-based communication system, one or more images, one or more files, one or more application links, one or more webpage links, one or more text blocks, or any combination thereof. In some examples of the method, apparatuses, and non-transitory computer-readable medium described herein, the layout of the document space includes a first quantity of columns and a second quantity of rows based on a threshold quantity of columns, a threshold column width, a threshold row height, or any combination thereof, and the document space includes one or more layouts, the one or more layouts including at least the layout.

The following provides an overview of aspects of the present disclosure:

Aspect 1: A method for document space configuration, comprising: receiving a first input indicating insertion of an object into a document space, the document space corresponding to a group-based communication system; in response to the first input, generating a card representing the object, the card comprises a preview image for the object and at least one link to a resource external to the document space that is associated with the object; updating a layout of the document space to comprise an additional column, an additional row, or both, wherein the additional column, the additional row, or both includes the card; sending, for display in a user interface of a user device, the document space comprising the card based at least in part on the updated layout; receiving a second input indicating selection and repositioning of the card in the user interface; and in response to the second input, further updating the layout of the document space based at least in part on the repositioning of the card in the user interface.

Aspect 2: The method of aspect 1, further comprising: receiving a third input indicating selection of the at least one link; and in response to the third input, sending, for display in the user interface, the resource external to the document space.

Aspect 3: The method of aspect 2, wherein the object comprises a message associated with a channel of the group-based communication system, and wherein sending, for display in the user interface, the resource external to the document space comprises: sending, for display in the user interface, a sequence of messages associated with the channel; and navigating to the message in the sequence of messages associated with the channel based at least in part on the at least one link.

Aspect 4: The method of aspect 3, further comprising: detecting an update to the message in the channel; and in response to the update to the message, updating the preview image for the object.

Aspect 5: The method of any of aspects 3 through 4, wherein the at least one link indicates a channel identifier associated with the channel and a post sequence number associated with a positioning of the message within the sequence of messages; and the navigating to the message is based at least in part on the channel identifier and the post sequence number.

Aspect 6: The method of any of aspects 3 through 5, wherein the card supports a first link to the message in the channel, a second link to the channel, a third link to a user profile corresponding to an author of the message, a fourth link to a webpage, or any combination thereof, the fourth link to the webpage is included in text of the message.

Aspect 7: The method of any of aspects 1 through 6, further comprising: retrieving a subset of information associated with the resource external to the document space, wherein the preview image for the object is based at least in part on the retrieved subset of information.

Aspect 8: The method of any of aspects 1 through 7, further comprising: receiving a request to create a channel in the group-based communication system; and in response to the request, creating the channel and the document space, wherein the document space is associated with the channel.

Aspect 9: The method of aspect 8, wherein sending, for display in the user interface of the user device, the document space comprises: sending a sequence of messages associated with the channel for display in a main pane of the user interface; and sending the document space for display in a sidebar of the user interface based at least in part on the document space being associated with the channel.

Aspect 10: The method of any of aspects 1 through 7, further comprising: receiving a request to create a document in the group-based communication system; and in response to the request, creating the document space, wherein the document comprises the document space.

Aspect 11: The method of any of aspects 1 through 10, wherein updating the layout of the document space further comprises: automatically resizing the card for display in the user interface based at least in part on a width of the additional column, a height of the additional row, or both.

Aspect 12: The method of any of aspects 1 through 11, further comprising: further in response to the second input, sending, for display in the user interface, a thumbnail image associated with the object.

Aspect 13: The method of any of aspects 1 through 12, further comprising: receiving a fourth input locking changes to the document space; receiving a fifth input indicating selection of the card in the user interface; and refraining from repositioning the card in the user interface in response to the fifth input based at least in part on the fourth input locking the changes to the document space.

Aspect 14: The method of any of aspects 1 through 13, wherein the document space comprises a first inline frame; and the card comprises a second inline frame different from the first inline frame.

Aspect 15: The method of any of aspects 1 through 14, wherein the first input comprises dragging and dropping the object into the document space or selecting an affordance triggering the insertion of the object into the document space.

Aspect 16: The method of any of aspects 1 through 15, wherein the second input comprises dragging and dropping the card from a first position in the layout of the document space to a second position in the layout of the document space.

Aspect 17: The method of any of aspects 1 through 16, wherein the layout of the document space comprises one or more messages associated with one or more channels of the group-based communication system, one or more images, one or more files, one or more application links, one or more webpage links, one or more text blocks, or any combination thereof.

Aspect 18: The method of any of aspects 1 through 17, wherein the layout of the document space comprises a first quantity of columns and a second quantity of rows based at least in part on a threshold quantity of columns, a threshold column width, a threshold row height, or any combination thereof; and the document space comprises one or more layouts, the one or more layouts comprising at least the layout.

Aspect 19: An apparatus for document space configuration, comprising a processor; memory coupled with the processor; and instructions stored in the memory and executable by the processor to cause the apparatus to perform a method of any of aspects 1 through 18.

Aspect 20: An apparatus for document space configuration, comprising at least one means for performing a method of any of aspects 1 through 18.

Aspect 21: A non-transitory computer-readable medium storing code for document space configuration, the code comprising instructions executable by a processor to perform a method of any of aspects 1 through 18.

It should be noted that the methods described above describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable ROM (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for document space configuration, comprising:

receiving a first input indicating insertion of an object into a document space, the object comprising a message associated with a channel of a group-based communication system, wherein the group-based communication system stores a definition of the document space that indicates the object based at least in part on the first input;

in response to the first input, generating a card representing the object, the card comprises a preview image for the object and at least one link to a resource external to the document space that is associated with the object;

automatically updating a layout of the document space to comprise an additional column, an additional row, or both, wherein the additional column, the additional row, or both includes the card, and wherein the definition of the document space further indicates a position corresponding to the card based at least in part on the automatic updating;

sending, for display in a user interface of a user device, the document space comprising the card based at least in part on the layout;

receiving a second input indicating selection and repositioning of the card in the user interface;

in response to the second input, further updating the layout of the document space based at least in part on the repositioning of the card in the user interface, wherein the further updating changes one or more positions corresponding to one or more cards indicated by the definition of the document space;

sending, for display in one or more second user interfaces of one or more second user devices, the document space in accordance with the further updating;

receiving a third input indicating selection of the at least one link;

sending, in response to the third input and for display in the user interface, a sequence of messages associated with the channel; and navigating to the message in the sequence of messages based at least in part on a post sequence number corresponding to the message indicated by the at least one link.

2. The method of claim 1, further comprising:

detecting an update to the message in the channel; and in response to the update to the message, updating the preview image for the object.

3. The method of claim 1, wherein:

the at least one link indicates a channel identifier associated with the channel and the post sequence number associated with a positioning of the message within the sequence of messages; and the navigating to the message is based at least in part on the channel identifier and the post sequence number.

4. The method of claim 1, wherein:

the card supports a first link to the message in the channel, a second link to the channel, a third link to a user profile corresponding to an author of the message, a fourth link to a webpage, or any combination thereof; and the fourth link to the webpage is included in text of the message.

5. The method of claim 1, further comprising:

retrieving a subset of information associated with the resource external to the document space, wherein the preview image for the object is based at least in part on the retrieved subset of information.

6. The method of claim 1, further comprising:

receiving a request to create the channel in the group-based communication system; and in response to the request, creating the channel and the document space, wherein the document space is associated with the channel.

7. The method of claim 6, wherein sending, for display in the user interface of the user device, the document space comprises:

sending a second sequence of messages associated with the channel for display in a main pane of the user interface; and sending the document space for display in a sidebar of the user interface based at least in part on the document space being associated with the channel.

8. The method of claim 1, further comprising:

receiving a request to create a document in the group-based communication system; and in response to the request, creating the document space, wherein the document comprises the document space.

9. The method of claim 1, wherein updating the layout of the document space further comprises:

automatically resizing the card for display in the user interface based at least in part on a width of the additional column, a height of the additional row, or both.

10. The method of claim 1, further comprising:

further in response to the second input, sending, for display in the user interface, a thumbnail image associated with the object.

11. The method of claim 1, further comprising:

receiving a fourth input locking changes to the document space;

receiving a fifth input indicating selection of the card in the user interface; and refraining from repositioning the card in the user interface in response to the fifth input based at least in part on the fourth input locking the changes to the document space.

12. The method of claim 1, wherein:

the document space comprises a first inline frame; and the card comprises a second inline frame different from the first inline frame.

13. The method of claim 1, wherein the first input comprises dragging and dropping the object into the document space or selecting an affordance triggering the insertion of the object into the document space.

14. The method of claim 1, wherein the second input comprises dragging and dropping the card from a first position in the layout of the document space to a second position in the layout of the document space.

15. The method of claim 1, wherein the layout of the document space comprises one or more messages associated with one or more channels of the group-based communication system, one or more images, one or more files, one or more application links, one or more webpage links, one or more text blocks, or any combination thereof.

16. The method of claim 1, wherein:

the layout of the document space comprises a first quantity of columns and a second quantity of rows based at least in part on a threshold quantity of columns, a threshold column width, a threshold row height, or any combination thereof; and the document space comprises one or more layouts, the one or more layouts comprising at least the layout.

17. An apparatus for document space configuration, comprising:

at least one processor;

at least one memory coupled with the at least one processor; and instructions stored in the at least one memory and executable by the at least one processor to cause the apparatus to:

receive a first input indicating insertion of an object into a document space, the object comprising a message associated with a channel of a group-based communication system, wherein the group-based communication system stores a definition of the document space that indicates the object based at least in part on the first input;

in response to the first input, generate a card representing the object, the card comprises a preview image for the object and at least one link to a resource external to the document space that is associated with the object;

automatically update a layout of the document space to comprise an additional column, an additional row, or both, wherein the additional column, the additional row, or both includes the card, and wherein the definition of the document space further indicates a position corresponding to the card based at least in part on the automatic updating;

send, for display in a user interface of a user device, the document space comprising the card based at least in part on the layout;

receive a second input indicating selection and repositioning of the card in the user interface;

in response to the second input, further update the layout of the document space based at least in part on the repositioning of the card in the user interface, wherein the further updating changes one or more positions corresponding to one or more cards indicated by the definition of the document space;

send, for display in one or more second user interfaces of one or more second user devices, the document space in accordance with the further updating;

receive a third input indicating selection of the at least one link;

send, in response to the third input and for display in the user interface, a sequence of messages associated with the channel; and navigate to the message in the sequence of messages based at least in part on a post sequence number corresponding to the message indicated by the at least one link.

18. A non-transitory computer-readable medium storing code for document space configuration, the code comprising instructions executable by a processor to:

receive a first input indicating insertion of an object into a document space, the object comprising a message associated with a channel of a group-based communication system, wherein the group-based communication system stores a definition of the document space that indicates the object based at least in part on the first input;

in response to the first input, generate a card representing the object, the card comprises a preview image for the object and at least one link to a resource external to the document space that is associated with the object;

automatically update a layout of the document space to comprise an additional column, an additional row, or both, wherein the additional column, the additional row, or both includes the card, and wherein the definition of the document space further indicates a position corresponding to the card based at least in part on the automatic updating;

send, for display in a user interface of a user device, the document space comprising the card based at least in part on the layout;

receive a second input indicating selection and repositioning of the card in the user interface;

in response to the second input, further update the layout of the document space based at least in part on the repositioning of the card in the user interface, wherein the further updating changes one or more positions corresponding to one or more cards indicated by the definition of the document space;

send, for display in one or more second user interfaces of one or more second user devices, the document space in accordance with the further updating;

receive a third input indicating selection of the at least one link;

send, in response to the third input and for display in the user interface, a sequence of messages associated with the channel; and navigate to the message in the sequence of messages based at least in part on a post sequence number corresponding to the message indicated by the at least one link.

\* \* \* \* \*